(12) United States Patent  
Anson

(10) Patent No.: US 9,298,479 B2
(45) Date of Patent: Mar. 29, 2016

(54) SYSTEMS AND METHODS FOR CONFIGURING, UPDATING, AND BOOTING AN ALTERNATE OPERATING SYSTEM ON A PORTABLE DATA READER

(75) Inventor: Gary S. Anson, Chesire, OR (US)

(73) Assignee: Datalogic ADC, Inc., Eugene, OR (US)

( * ) Notice: Subject to any disclaimer, the term of this patent is extended or adjusted under 35 U.S.C. 154(b) by 904 days.

(21) Appl. No.: 12/337,301

(22) Filed: Dec. 17, 2008

(65) Prior Publication Data

US 2009/0172384 A1 Jul. 2, 2009

Related U.S. Application Data

(60) Provisional application No. 61/018,371, filed on Dec. 31, 2007.

(51) Int. Cl.
*G06F 9/445* (2006.01)

(52) U.S. Cl.
CPC .................. *G06F 9/44505* (2013.01)

(58) Field of Classification Search
CPC ....................................... G06F 15/177
USPC ................................. 713/1, 2, 100
See application file for complete search history.

(56) References Cited

U.S. PATENT DOCUMENTS

| | | | |
|---|---|---|---|
| 4,866,257 A | 9/1989 | Elliott et al. | |
| 5,487,161 A | 1/1996 | Koenck et al. | |
| 5,546,585 A | 8/1996 | Soga | |
| 5,815,731 A | 9/1998 | Doyle et al. | |
| 6,041,374 A | 3/2000 | Postman et al. | |
| 6,327,653 B1 | 12/2001 | Lee | |
| 6,351,810 B2 | 2/2002 | Gupta | |
| 6,460,093 B1 | 10/2002 | Taugher | |
| 6,601,236 B1 | 7/2003 | Curtis | |
| 6,612,495 B2 | 9/2003 | Reddersen et al. | |
| 6,704,824 B1 | 3/2004 | Goodman | |
| 6,732,218 B2 | 5/2004 | Overtoom et al. | |
| 6,877,663 B2 | 4/2005 | Kelly et al. | |
| 6,920,553 B1 | 7/2005 | Poisner | |

(Continued)

FOREIGN PATENT DOCUMENTS

DE 10244975 4/2004
EP 1510915 3/2005

(Continued)

OTHER PUBLICATIONS

"Installing a Linux Distro to An USB Drive", http://news.softpedia.com/news/Installing-a-Linux-distro-to-an-USB-drive-33265.shtml, Aug. 19, 2006, 4 pages.

(Continued)

*Primary Examiner* — Kim Huynh
*Assistant Examiner* — Brandon Kinsey
(74) *Attorney, Agent, or Firm* — Stoel Rives LLP

(57) ABSTRACT

Systems and methods are provided for updating configuration settings, updating an OS image, and booting an alternate OS on a portable data reader including a reading engine for reading data from an object. Configuration settings of a portable data reader may be updated by detecting whether a storage device having a set of updated configuration settings stored thereon has been coupled to the portable data reader and, if so, updating one or more configuration settings on the portable data reader with one or more of the updated configuration settings from the storage device.

23 Claims, 9 Drawing Sheets

(56) References Cited

U.S. PATENT DOCUMENTS

| | | |
|---|---|---|
| 7,000,057 B1 | 2/2006 | Novell et al. |
| 7,017,039 B2 | 3/2006 | Hensley |
| 7,028,109 B2 | 4/2006 | Saito et al. |
| 7,273,179 B2 | 9/2007 | Anson et al. |
| 7,405,662 B2 | 7/2008 | Steinke et al. |
| 2001/0008000 A1* | 7/2001 | Kikinis et al. ............... 710/100 |
| 2003/0036843 A1 | 2/2003 | Okude et al. |
| 2003/0110371 A1 | 6/2003 | Yang et al. |
| 2003/0229749 A1 | 12/2003 | Saito et al. |
| 2003/0236932 A1 | 12/2003 | Saito et al. |
| 2004/0017772 A1 | 1/2004 | Saito et al. |
| 2004/0037310 A1 | 2/2004 | Saito et al. |
| 2004/0049617 A1 | 3/2004 | Wang et al. |
| 2004/0095382 A1* | 5/2004 | Fisher et al. ................ 345/744 |
| 2004/0103172 A1* | 5/2004 | Chen et al. .................. 709/221 |
| 2004/0199909 A1 | 10/2004 | Goodman |
| 2004/0230710 A1 | 11/2004 | Goodman |
| 2005/0028172 A1 | 2/2005 | Yoshikawa et al. |
| 2005/0038927 A1 | 2/2005 | Choi et al. |
| 2005/0080936 A1 | 4/2005 | Ray et al. |
| 2005/0144613 A1 | 6/2005 | Tseng |
| 2005/0198233 A1 | 9/2005 | Manchester et al. |
| 2005/0204072 A1 | 9/2005 | Nakagawa |
| 2005/0262271 A1 | 11/2005 | Ytterstrom |
| 2005/0268092 A1* | 12/2005 | Shankar et al. ............. 713/164 |
| 2005/0278461 A1 | 12/2005 | Ohta |
| 2006/0026304 A1* | 2/2006 | Price .............................. 710/8 |
| 2006/0031826 A1* | 2/2006 | Hiramatsu et al. ........... 717/168 |
| 2006/0065743 A1 | 3/2006 | Fruhauf |
| 2006/0069813 A1 | 3/2006 | Biamonte et al. |
| 2006/0098666 A1* | 5/2006 | Francis Conde Powell .. 370/401 |
| 2006/0138232 A1 | 6/2006 | Hammerslag et al. |
| 2006/0156415 A1* | 7/2006 | Rubinstein et al. ............ 726/27 |
| 2006/0238305 A1 | 10/2006 | Loving et al. |
| 2006/0244422 A1* | 11/2006 | DiGiovanna et al. ......... 320/137 |
| 2007/0022328 A1* | 1/2007 | Tarra et al. ................... 714/100 |
| 2007/0057063 A1 | 3/2007 | Zhu et al. |
| 2007/0143589 A1* | 6/2007 | Rawe et al. ...................... 713/2 |
| 2008/0052439 A1* | 2/2008 | Young et al. .................. 710/305 |
| 2008/0162675 A1* | 7/2008 | Bolay et al. ................... 709/221 |
| 2009/0044003 A1* | 2/2009 | Berthiaume et al. .......... 713/100 |
| 2009/0064038 A1* | 3/2009 | Fleischman et al. .......... 715/810 |

FOREIGN PATENT DOCUMENTS

| | | |
|---|---|---|
| JP | 02204850 | 8/1990 |
| JP | 4260908 | 9/1992 |
| JP | 11-143809 | 5/1999 |
| JP | 2000-183999 | 6/2000 |
| JP | 2003-216431 | 7/2003 |
| TW | 230864 | 4/2005 |
| WO | WO 2005/015412 A1 | 2/2005 |
| WO | WO 2005/088447 A1 | 9/2005 |
| WO | WO 2007/100432 A1 | 9/2007 |

OTHER PUBLICATIONS

"What is DSL?", http://www.damnsmalllinux.org, printed Feb. 6, 2009, 3 pages.

International Searching Authority, International Search Report and Written Opinion, International Application No. PCT/US2008/087289, dated Jul. 10, 2009, 8 pages.

European Patent Office, European Search Report, dated Sep. 7, 2011, 5 pages.

Sebastian Marius Kirsch, Larve Nimmersatt, Mehrere Betriebs-syteme mit dem GNU-Bootloader Grub, dated Sep. 25, 2000, 4 pages.

* cited by examiner

SYSTEMS AND METHODS FOR CONFIGURING, UPDATING, AND BOOTING AN ALTERNATE OPERATING SYSTEM ON A PORTABLE DATA READER

RELATED APPLICATIONS

This application claims the benefit under 35 U.S.C. §119(e) of U.S. Provisional Application No. 61/018,371, filed Dec. 31, 2007, which is hereby incorporated by reference in its entirety.

COPYRIGHT NOTICE

© 2008 Datalogic Mobile, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The field of the present invention relates generally to portable data reading devices and methods of configuring, updating, and booting an alternate operating system on data reading devices.

BACKGROUND INFORMATION

Data reading devices, such as barcode or optical code scanners, RFID readers, and the like, are a popular means for data acquisition in computerized processing systems. Barcode scanners are used to optically capture barcode patterns or other symbols or information imprinted on different surfaces in order to transmit the information encoded in the barcode pattern or symbol to a host processing device.

Two major types of commonly used barcode scanners are flying spot laser scanners and image based barcode scanners. Flying spot laser barcode scanners generally obtain barcode information by sweeping a laser spot across the barcode. The laser spot may be generated from a light source inside an oscillating reflecting surface, typically a mirror. The light reflected from the barcode is collected by a photosensor, which outputs an analog waveform representing the relative spacing of the bars in the barcode. The analog signal may then be digitized and decoded into data representing the information encoded in the barcode.

Barcode scanning devices based on solid state image circuitry, such as charge coupled devices (CCDs), are also conventionally known. These types of barcode scanners are typically implemented using either a one-dimensional or two-dimensional imaging array of photosensors (or pixels) to capture the barcode. One-dimensional CCD readers capture a linear cross section of the barcode at once, producing an analog waveform whose amplitude represents the relative darkness and lightness of the barcode. Two-dimensional CCD readers capture an entire two-dimensional image at once.

A relatively new type of data reading technology is radio frequency identification (RFID). An RFID system typically employs at least two components, a "transponder" or "tag," which is attached to the physical item to be identified, and a "reader," which sends an electromagnetic signal to the transponder and then detects a response. Typically, the reader emits an RF signal which is received by the transponder after the transponder comes within an appropriate range. In response to the signal from the reader, the transponder sends a modulated RF signal back to the reader. The reader detects this modulated signal and receives the information from the transponder by decoding the modulated signal. After receiving the information from the transponder, the reader can either store the decoded information or transmit the decoded signal to a computer or other host.

The transponder used in an RFID system may be either "passive" or "active." A passive transponder can be a simple resonant circuit, including an inductive coil and a capacitor. Passive transponders are generally powered by the carrier signal transmitted from the reader. Active transponders, on the other hand, generally include transistors or other active circuitry, and require their own power source.

Barcode scanners and RFID readers may be physically separate from host processing devices, such as personal computers, which provide decoding software, computer storage, and communication interfaces. Increasingly, however, barcode scanners and RFID scanners are being integrated into portable host processing devices. For instance, the Falcon® 4420 data collection terminal available from Datalogic Mobile, Inc. of Eugene, Oreg., combines a laser barcode scanner, storage memory, and wireless communication interface in a compact, portable form factor. Such portable devices can be easily transported to different locations within a warehouse, retail store, or the like, greatly simplifying the tasks of receiving and inventorying.

Updating configuration settings, updating an operating system (OS) image, and booting an alternate OS on a portable data reader may require intervention by the user (e.g., to initiate updates, monitor status, and respond to prompts) and may also require connection to a host computer. Accordingly, the present inventor has recognized a need for techniques to update configuration settings, update an OS image, and boot an alternate OS on a portable data reader that does not require a host computer and that requires little or no user intervention.

DETAILED DESCRIPTION OF EMBODIMENTS

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Overview

Before describing detailed examples of updating configuration settings, updating an operating system (OS) image, and booting an alternate OS on a portable data reader, a representative portable data reader and associated concepts will first be described.

Figure 1:
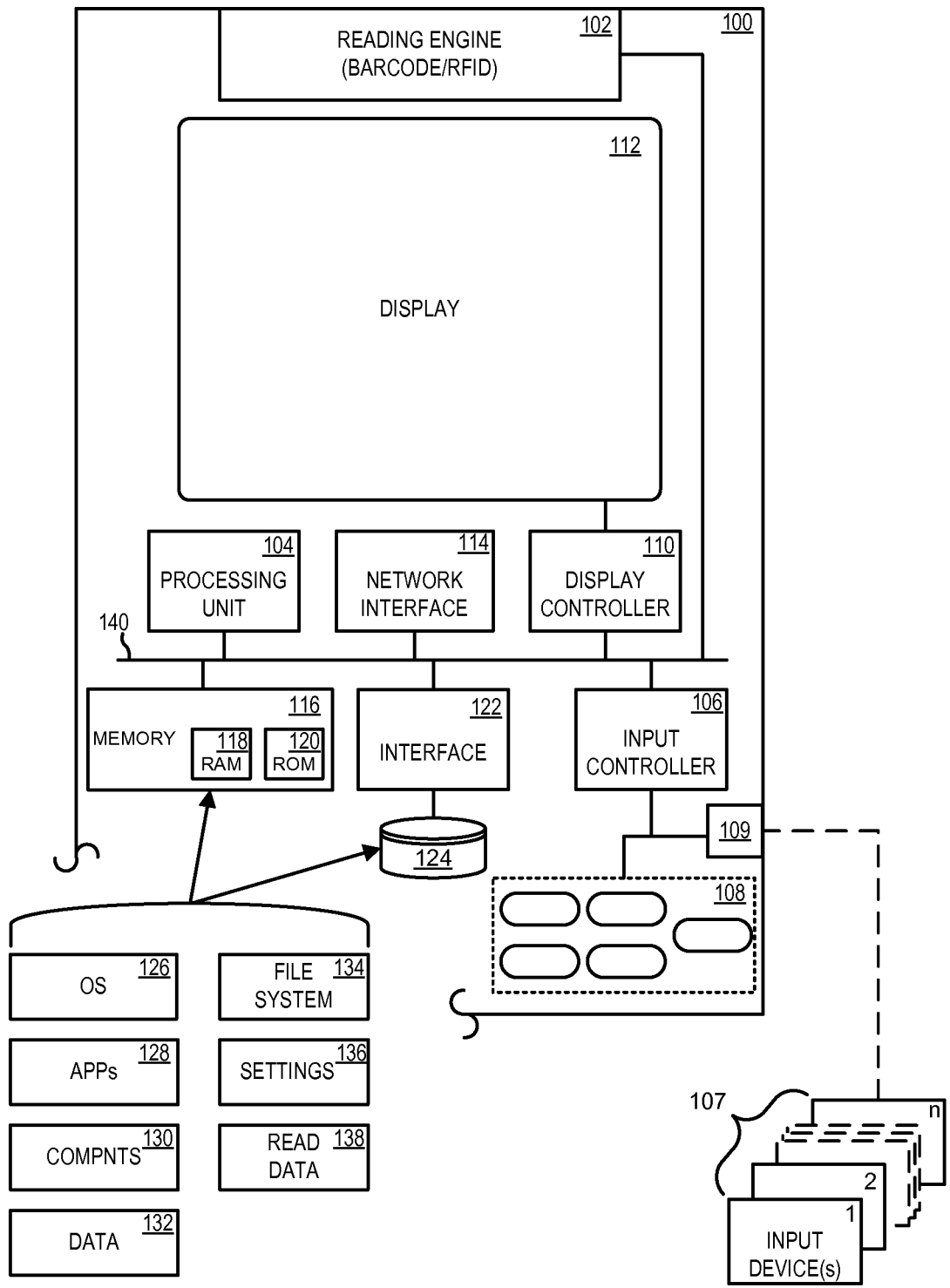
FIG. 1 is a block diagram of portable data reader, according to one embodiment.

FIG. 1 is a block diagram of portable data reader 100 according to one embodiment, such as a barcode scanner, radio frequency identification (RFID) reader, industrial PDA, or portable data terminal. For instance, the portable data reader 100 may include the Pegaso™ industrial PDA or Falcon® data collection terminal available from Datalogic Mobile, Inc. of Eugene, Oreg.

The portable data reader 100 may include a reading engine 102, such as a barcode scanning engine, RFID reading engine, or both. The reading engine 102 may read barcode symbols from a physical object, information from an RFID tag, or both. Various reading engines 102 are known in the art. For instance, a laser barcode scan engine 102 is available from Datalogic Mobile, Inc. or other manufacturers. Similarly, an RFID reading engine is available from Datalogic Mobile, Inc., SAT Corporation of Houston, Tex., or other manufacturers. In various other embodiments, the reading engine 102 may provide dual barcode/RFID reading. As used herein, barcode scan engines 102 may also encompass CCD-based imagers.

The portable data reader 100 may include a processing unit 104. The processing unit 104 may be any of various commercially available processors or other logic machine capable of executing instructions, such as an Intel® XScale™ PXA270 520 MHz processor. Dual microprocessors or other multi-processor architectures may also be employed as the processing unit 104.

A standard input controller 106 may be provided to receive user input from a keypad 108, a pointing device (not shown), or other wired/wireless input devices. The input controller 106 may comprise a universal interface driver application specific integrated circuit (UIDA). Further details of the UIDA can be found in U.S. Pat. No. 6,877,663, which is hereby incorporated by reference in its entirety. Other input devices (e.g., input device(s) 107) may be included, such as a microphone, digital camera, fingerprint scanner, touchscreen, touchpad, trackball, and tablet. While the input devices 107 may be integrated into the portable data reader 100 and coupled to the processing unit 104 via the input controller 106, the input devices may also connect via other interfaces, such as one or more connector(s) 109. The connector 109 may include one or more data interfaces, bus interfaces, wired or wireless network adapters, or modems for transmitting and receiving data. Accordingly, the input controller 106 may include one or more of hardware, software, and firmware to implement one or more protocols, such as stacked protocols along with corresponding layers, such as for example application layers (e.g., HTTP), transport layers (e.g., TCP), network layers (e.g., IP), and link layers (e.g., Ethernet). According to one embodiment, the connector 109 functions as a serial port (e.g., RS232). However, the connector 109 may also support other interfaces, such as a Universal Serial Bus (USB) port, an Ethernet port, a parallel port, an IEEE 1394 serial port, or an IR interface. The input controller 106 may also support various wired, wireless, optical, and other communication standards.

The portable data reader 100 may present data, prompts, and otherwise communicate with a user via one or more display devices 112, such as an integrated liquid crystal display (LCD), organic light-emitting diode (OLED), cathode ray tube (CRT) display, or other suitable micro display. A display controller 110 may drive the display device 112.

The portable data reader 100 may also include a network interface 114 to communicate with one or more other devices, such as a server, a host computer, or a point-of-sale terminal via an external network (not shown). For example, data gathered by, or decoded by, the portable data reader 100 may be passed along to a server. The network interface 114 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radio frequency identification (RFID). In addition, a modem module (not shown) or Ethernet module (not shown) may be coupled to the connector 109 to facilitate a WAN networking environment.

The portable data reader 100 further includes a memory 116, which may be implemented using one or more standard memory devices. The memory devices may include, for instance, RAM 118, ROM 120, and EEPROM devices, and may also include magnetic or optical storage devices, such as hard disk drives, CD-ROM drives, and DVD-ROM drives. The portable data reader 100 may also include an interface 122 coupled to an internal hard disk drive 124. Interface 122 may also be coupled to removable memory, such as flash memory, a magnetic floppy disk drive, an optical disk drive, or another drive. Further, the interface 122 (and/or input controller 106) may be configured for external drive implementations, such as over a USB, IEEE 1194, or PCMCIA connection.

In one embodiment, any number of program modules may be stored in the drives (e.g., drive 124) and RAM 118, including an operating system (OS) 126, one or more application programs 128, other program modules 130 (e.g., instructions to implement the methods described below), data 132, file system 134, settings 136, and read data 138. All or portions of the program modules may also be cached in RAM 118. Any suitable operating system 126 may be employed, such as Windows CE 5.0, Windows Mobile, Linux, or other commercially available or proprietary operating systems.

A boot loader, such as a basic input/out system (BIOS), may be stored in a non-volatile memory 120, such as ROM, EPROM, EEPROM, for loading the OS 126 of the portable data reader 100. According to one embodiment, the OS 126 is booted on the portable data reader 100 as follows. Upon initialization (e.g., when the portable data reader 100 is turned on or reset), the processing unit 104 runs the boot loader stored in the non-volatile memory 120. The boot loader reads an OS image into operational memory within the processing unit 104, RAM 118, or both. The OS image may comprise an executable file containing an operating system kernel that the boot loader uses to load the OS 126. The OS image may be stored in the non-volatile memory 120 along with the boot loader, or may be stored in another suitable location, such as in the internal hard disk drive 124 (e.g., within the master boot record). Once the boot loader loads the OS image into operational memory, control of the boot up process transitions to the OS image, which reads the OS 126 (e.g., the components and modules that comprise the OS) into volatile memory (e.g., RAM 118) from a non-volatile memory (e.g., the internal hard disk drive 124). Once the OS 126 has been loaded into memory, control of the portable data reader 100 transitions to the OS 126. Booting the OS 126 on the portable data reader 100 may comprise additional or fewer steps. For example, the boot loader may perform a power-on self test (e.g., test whether the processor, memory, and I/O devices are functioning) before loading the OS image, may sequence through a predetermined list of non-volatile storage devices in search of an OS image to load, and may comprise multiple stages.

The memory 116, the internal hard disk drive 124, or both, may also store a number of settings 136 for the portable data reader 100. As will be described in greater detail below, the settings 136 may include various symbology settings, device settings (e.g., user-interface), and network settings. Additionally, the memory 116, the internal hard disk drive 124, or both, may store read data 138 (e.g., symbols and information read from barcodes and RFID tags) obtained by the reading engine 102. Any of the foregoing may be stored within, or indexed by, a file system 134, which may be managed by the OS 126.

The above-described components, including the reading engine 102, processing unit 104, input controller 106, display controller 110, network interface 114, memory 116, and interface 122, may be interconnected via a bus 140. While a bus-based architecture is illustrated in FIG. 1, other types of architectures are also suitable (e.g., one or more components may be directly coupled to one another). While the illustrated embodiment depicts one possible configuration of a portable data reader 100, it should be recognized that a wide variety of hardware and software configurations may be provided. For example, other versions of the portable data reader 100 may have less than all of these components or may contain other components. Other examples and additional details regarding portable data readers may be found in commonly owned U.S. Pat. No. 7,273,179, issued Sep. 25, 2007, entitled "Portable Data Reading Device With Integrated Web Server For Configuration And Data Extraction," which is incorporated herein by reference in its entirety.

USB Architecture

Traditionally, updating configuration settings, updating an OS image, and booting an alternate OS on a portable data reader involved connecting the portable data reader to a host computer, installing custom software on the host computer, and sequencing through a series of prompts. As will be described in more detail below, updating configuration settings, updating an OS image, and booting an alternate OS on a portable data reader may be performed by connecting an external USB mass storage device or other memory device to the portable data reader. However, before describing the details of FIGS. 2-8, the USB architecture (e.g., USB 2.0) and associated concepts will be described in this section. The USB architecture comprises three components: (1) a host; (2) one or more hubs; and (3) one or more functions. Generally, there is only one host in a USB system and the host may be implemented in any combination of hardware, firmware, or software. The host may detect the attachment and removal of USB devices, manage USB standard control flow between the host and USB devices, manage data flow between the host and USB devices, collect status and activity statistics, and control the electrical interface between the Host Controller and USB devices, including power limits. Hubs may provide additional attachment points to the USB (e.g., the host may have a hub to which other hubs and functions may be connected). Functions may provide a capability to the host, such as an ISDN connection or providing storage. A USB device (e.g., a peripheral) may refer to a logical or physical entity that performs a function. For example, a device may refer to a single hardware component, such as a memory device, or a device may refer to a collection of hardware components that perform a particular function, such as a USB interface device. Thus, a device may be either a hub or function.

USB On-The-Go (OTG) is a supplement to the USB 2.0 specification and was developed to allow portable devices to communicate with each other over a USB interface. With respect to USB OTG, all devices are considered peripherals. In other words, when two USB OTG devices are connected, either device may lack one or more characteristics, including, for example, storage for a large number of device drivers, an ability to source a large current, a USB A-type connector, or any combination thereof. However, the USB OTG devices may include one or more characteristics, such as, for example, limited host capability, session request protocol (SRP), host negotiation protocol (HNP), and/or a micro-AB receptacle. A limited host generally has little or no ability to dynamically add new device support. Instead, the limited host is generally designed to have host control over a predetermined number of peripherals, such as a USB mass storage device. As the name implies, SRP allows a B-device (e.g., the device that starts a session as a peripheral) to initiate a data session with an A-device (e.g., the device that supplies power to the B-device and acts as the host at the start of a session). HNP allows the devices to switch roles (e.g., host and peripheral roles).

Additional details regarding the USB architecture (e.g., USB 2.0 and USB OTG) may be found in the Universal Serial Bus Specification, Revision 2.0, dated Apr. 27, 2000 and the On-The-Go Supplement to the USB 2.0 Specification Revision 1.3, dated Dec. 5, 2006, both of which are incorporated herein by reference in their entireties.

Configuration Settings

Traditionally, configuration settings on a portable data reader have been updated using one of several methods. For example, the user may navigate to one or more menus and select desired configuration settings (e.g., using a portable data reader with an input device and a display or coupling the portable data reader to a display via a host or other computer). However, navigating through a menu system may be time consuming. Additionally, if the user would like to select a configuration setting not currently installed on the portable data reader (e.g., the capability of reading or decoding a new barcode symbology), the user may need to download the new configuration setting and connect the portable data reader to a host computer to install the new configuration setting.

Figure 2:
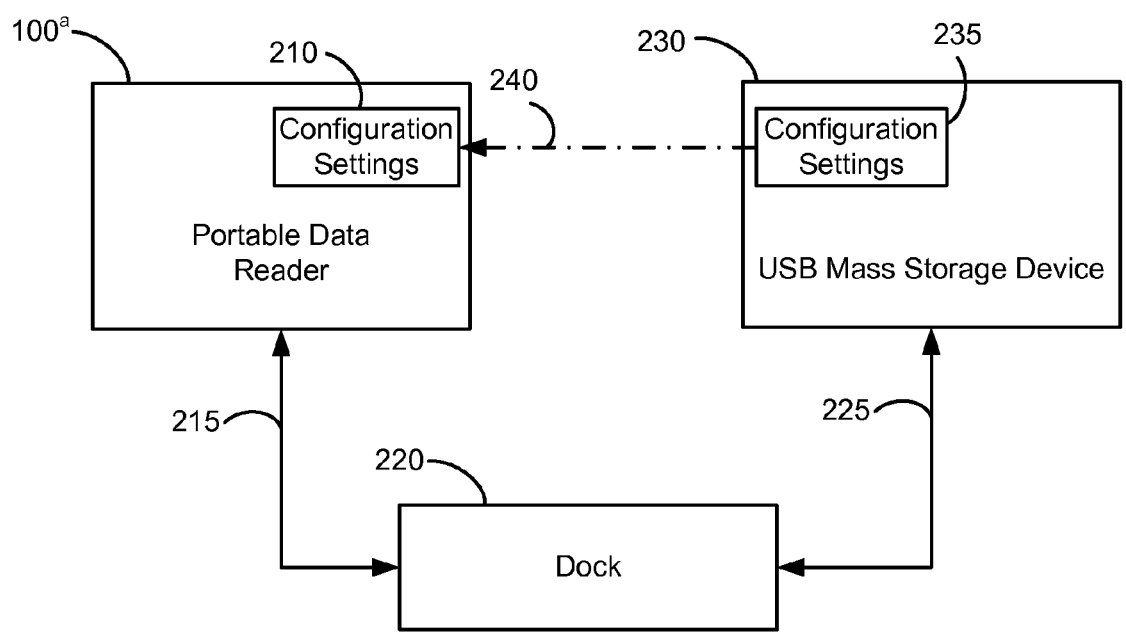
FIG. 2 is a block diagram illustrating a portable data reader and a USB mass storage device connected via a docking station, according to one embodiment.

FIG. 2 is a block diagram of a portable data reader 100a and a USB mass storage device 230 coupled together via a docking station 220, according to one embodiment (in FIG. 2 reference numerals with a superscripted symbol, e.g., 100a, indicate elements similar to those of the same name as those described with respect to FIG. 1, i.e., the portable data reader 100). As will be described in more detail below, if one or more configuration settings 235 are stored on the USB mass storage device 230 and the USB mass storage device 230 is coupled to the docking station 220, one or more configuration settings 210 on the portable data reader 100a may be updated by coupling the portable data reader 100a to the docking station 220, such as when the portable data reader 100a is placed in the docking station 220 for charging. Thus, a portable data reader having configuration settings optimized for performing shipping functions may be placed in a docking station to have the configuration settings of the portable data reader optimized for price verification, for example.

The one or more configuration settings 210 may be stored in memory 116 (FIG. 1), drive 124, another memory, or a suitable combination thereof. The configuration settings 210 may include one or more of the following: various display settings, network settings, device settings, decoding settings, user interface settings, and input settings. Other configuration settings 210 may be provided.

The decoding settings of the portable data reader 100a may allow a user to select a decoding device, decoding options, general options, and audio properties. For example, the user may be able to select from various decoding devices, such as a barcode or optical code scanner, magnetic stripe reader, or RFID reader. In addition, the user may be able to select from various general options, such as programming labels, symbology IDs, label prefixes and suffixes, data separator options, whether a spotting beam should be enabled, and the spotting beam timeout. The audio properties may include, for instance, a beeper volume and a number of good read tones. Various decoding options including user IDs (e.g., certain users may only be authorized to decode using certain symbologies), redundancy levels, decoding aggressiveness, symbologies, as well as various symbology-related settings, such as minimum length, maximum length, and trioptic settings. The various decoding settings will depend, of course, on the specific reading engine 102 being used.

The portable data reader 100a may be configured to read or decode certain symbology types. In the context of barcode scanning, symbologies are effectively barcode languages. Different symbologies provide different tradeoffs in terms of the size of the symbol set, the encoding density, and the readability of the symbols. Various symbologies are known in the art. For example, one-dimensional (1D) barcode symbologies may include Code 128, Code 29, Interleaved 2 of 5, matrix 2 of 5, Universal Product Code (UPC), Extended Code 39, Code 93, UCC 128, Codabar, EAN/JAN, MSI, Zip+4, Pharmacode 39, RSS, Standard 2 of 5, Trioptic, DPBC POSTNET. Examples of two-dimensional (2D) symbologies include PDF 417, DataMatrix Code, and MaxiCode.

The various display settings, network settings, device settings, user interface settings, and input settings will depend, of course, on the specific portable data reader 100a. For example, the display settings may include backlight settings and display configuration (e.g., background settings, coloring scheme, display resolution, and display rotation). The network settings may include Bluetooth™ settings, internet options (e.g., default web pages, connection settings, security, privacy, and advanced options), network and dial-up connection settings (e.g., IP address settings and name server settings), host computer connection options (e.g., USB or RS232 serial port connections), and WiFi settings. The user interface and input settings may include input panel properties, keyboard configurations, and stylus calibration. The device settings may include data and time settings, error reporting, password settings, and power configuration settings.

As will be described in more detail with respect to FIG. 3, one or more configuration settings 210 on the portable data reader 100a may be updated with configuration settings 235 stored on the USB mass storage device 230 (as illustrated by the logical update 240). According to one embodiment, the USB mass storage device 230 comprises a flash memory device. However, the USB mass storage device 230 may include other memory devices, such as magnetic hard drives, optical drives (e.g., a CD-ROM or DVD reader and writer drives), floppy drives, digital cameras, digital audio players, and mobile phones. According to one embodiment, the configuration settings 235 may be stored within, or indexed by, a configuration settings file type. For example, the configuration settings file may be a text file (*.txt) with a set of linked values (e.g., decoding device="bar code scanner"; symbology="Code 39"; and backlight="on"). However the configuration settings file may take another suitable form. For example, the configuration settings may be formatted such that the configuration settings may be transmitted as Simple Network Management Protocol (SNMP) Management Information Base (MIB) data, which may define a set of configuration settings. The following example lists partial MIB file contents for a Falcon® data collection terminal. For brevity, only portions of the example MIB file contents are provided.

```
-- ********************************************************
-- Falcon CE (fce) Attributes
-- The fce Object class provides specific information to support operation
of an example Falcon CE interface, such as decoder control.
    Fce         OBJECT IDENTIFIER ::= {pscMW 1}
-- Falcon CE General System (fceGen) Attributes
    fceGen      OBJECT IDENTIFIER ::= {fce 1}
-- Falcon CE Scanner (fceScan) Attributes
    fceScan     OBJECT IDENTIFIER ::= {fce 2}
    genDecode   OBJECT IDENTIFIER ::= {fceScan 1}
    code39      OBJECT IDENTIFIER ::= {fceScan 2}
    trioptic    OBJECT IDENTIFIER ::= {fceScan 3}
    pharmacode  OBJECT IDENTIFIER ::= {fceScan 4}
    s25         OBJECT IDENTIFIER ::= {fceScan 5}
    m25         OBJECT IDENTIFIER ::= {fceScan 6}
    i25         OBJECT IDENTIFIER ::= {fceScan 7}
    codabar     OBJECT IDENTIFIER ::= {fceScan 8}
    ames        OBJECT IDENTIFIER ::= {fceScan 9}
    code93      OBJECT IDENTIFIER ::= {fceScan 10}
    code128     OBJECT IDENTIFIER ::= {fceScan 11}
    ucc128      OBJECT IDENTIFIER ::= {fceScan 12}
    upcean      OBJECT IDENTIFIER ::= {fceScan 13}
    upcA        OBJECT IDENTIFIER ::= {fceScan 14}
    upcE        OBJECT IDENTIFIER ::= {fceScan 15}
    upcE0       OBJECT IDENTIFIER ::= {fceScan 16}
    upcE1       OBJECT IDENTIFIER ::= {fceScan 17}
    upcext      OBJECT IDENTIFIER ::= {fceScan 18}
    ean13       OBJECT IDENTIFIER ::= {fceScan 19}
    ean8        OBJECT IDENTIFIER ::= {fceScan 20}
    code11      OBJECT IDENTIFIER ::= {fceScan 21}
    msi         OBJECT IDENTIFIER ::= {fceScan 22}
    msr         OBJECT IDENTIFIER ::= {fceScan 23}
    label45     OBJECT IDENTIFIER ::= {fceScan 24}
    rss14       OBJECT IDENTIFIER ::= {fceScan 25}
    rsslimit    OBJECT IDENTIFIER ::= {fceScan 26}
    rssexp      OBJECT IDENTIFIER ::= {fceScan 27}
    code16k     OBJECT IDENTIFIER ::= {fceScan 28}
    code49      OBJECT IDENTIFIER ::= {fceScan 29}
    pdf417      OBJECT IDENTIFIER ::= {fceScan 30}
    datamatrix  OBJECT IDENTIFIER ::= {fceScan 31}
    maxicode    OBJECT IDENTIFIER ::= {fceScan 32}
    micropdf    OBJECT IDENTIFIER ::= {fceScan 33}
    composite   OBJECT IDENTIFIER ::= {fceScan 34}
    qrcode      OBJECT IDENTIFIER ::= {fceScan 35}
    aztec       OBJECT IDENTIFIER ::= {fceScan 36}
    ocr         OBJECT IDENTIFIER ::= {fceScan 37}
    image       OBJECT IDENTIFIER ::= {fceScan 38}
```

-continued

```
-- Falcon CE Power (fcePwr) Attributes
    fcePwr      OBJECT IDENTIFIER ::= {fce 3}
-- Falcon CE Network (fceNetwork) Attributes
    fceNetwork  OBJECT IDENTIFIER ::= {fce 4}
-- Falcon CE FDU (fceFDU) Attributes
    fceFDU      OBJECT IDENTIFIER ::= {fce 5}
-- Falcon CE Command (fceCmnd) Attributes
    fceCmnd     OBJECT IDENTIFIER ::= {fce 99}
-- Falcon 4410 (F4410) Attributes
-- The F4410 object class provides specific information to support
operation of a Falcon 4410 CE .NET, such as versions, system flags, and
decoder control.
    f4410       OBJECT IDENTIFIER ::= {pscMW 2}
-- Falcon 4410 General System (f4410Sys) Attributes
-- The f4410Sys object class provides specific information to support
system level settings.
    f4410Sys    OBJECT IDENTIFIER ::= {f4410 1}
-- ************************************************************
```

According to one embodiment, the USB mass storage device 230 is connected to the portable data reader 100a via the docking station 220 (e.g., a cradle for the portable data reader 100a). The dock 220 may have a connector to facilitate a connection between the portable data reader 100a and the dock 220 with or without a cable. For example, the dock 220 may have contacts configured to receive a corresponding connector on the portable data reader 100a (e.g., the connector 109 of FIG. 1). Once connected to the dock 220, the portable data reader 100a may transfer data to and from the dock 220 via data link 215. In addition, the dock 220 may also charge a battery within the portable data reader 100a (using a power supply connected to the dock 220).

The dock 220 may also have a connector to facilitate a connection between the USB mass storage device 230 and the dock 220. For example, the connector may be a USB A-type receptacle or plug, a B-type receptacle or plug, a micro-AB receptacle or plug, or other micro or mini USB plug. In addition the connector may comprise an RS232 connector or PCMCIA connector. Once connected to the dock 220, the USB mass storage device 230 may transfer data to and from the dock 220 via data link 225.

According to one embodiment, the connector 109 of the portable data reader 100a facilitates both USB and RS232 serial bus connections. For example, the connector 109 may include 16 pins, four of which may be used for USB (e.g., $V_{BUS}$, D+, D−, and GND) and eight of which may be used for RS232 (e.g., RX, TX, CTS, RTS, DSR, DTR, and GND). The remaining pins may be used for power and ground connections, a USB OTG ID signal, other signals (e.g., when the portable data reader 100a is connected to the dock 220), or may not be connected. Accordingly, the portable data reader 100a may connect to a host computer in several ways using one or more cables. For example, a cable may facilitate a connection between the portable data reader 100a and a USB connector on the host computer. Further, a cable may facilitate a RS232 connection. Thus, the dock 220 may be configured to convert the I/O connector of the portable data reader 100a into both a USB connector and RS232 connector. In other words, the dock 220 may pass the RS232 pins to a RS232 connector mounted thereto and pass the USB pins to a USB connector mounted thereto (e.g., a type-A connector, a type-B connector, or a micro-AB receptacle). Thus, the dock 220 may provide a straight through connection between the portable data reader 100a and the USB mass storage device 230 when both devices are connected to the dock 220. However, the dock 220 may also contain logic, such as logic to implement a USB hub.

According to another embodiment, the portable data reader 100a contains a micro-AB receptacle and is configured to support USB OTG peripherals. In other words, the portable data reader 100a may itself be a fully compliant USB 2.0 peripheral, and may also support USB OTG features, such as limited host capability (e.g., to support a USB mass storage device), session request protocol, and host negotiation protocol. In addition, the portable data reader 100a may have full host capability. Thus, the USB mass storage device 230 may be directly connected to the portable data reader 100a if the portable data reader 100a incorporates a suitable connector (e.g., a type-A receptacle or a micro-AB receptacle). Other suitable methods of connecting a USB mass storage device (or other peripheral device) to a portable data reader may be utilized, such as one or more of the interconnection systems, methods, and devices described in commonly owned U.S. Pat. No. 6,612,495, entitled "Multiple/Interface Selection System For Computer Peripherals," which is incorporated herein by reference in its entirety, one or more of the host interface drivers described in commonly owned U.S. Pat. No. 6,877,663, entitled "Universal Interface Driver System For Data Reader," which is incorporated herein by reference in its entirety, or one or more of the interfaces described in commonly owned U.S. Pat. No. 6,041,374, entitled "PCMCIA Interface Card For Coupling Input Devices Such As Barcode Scanning Engines To Personal Digital Assistants And Palmtop Computers," which is incorporated herein by reference in its entirety.

Figure 3:
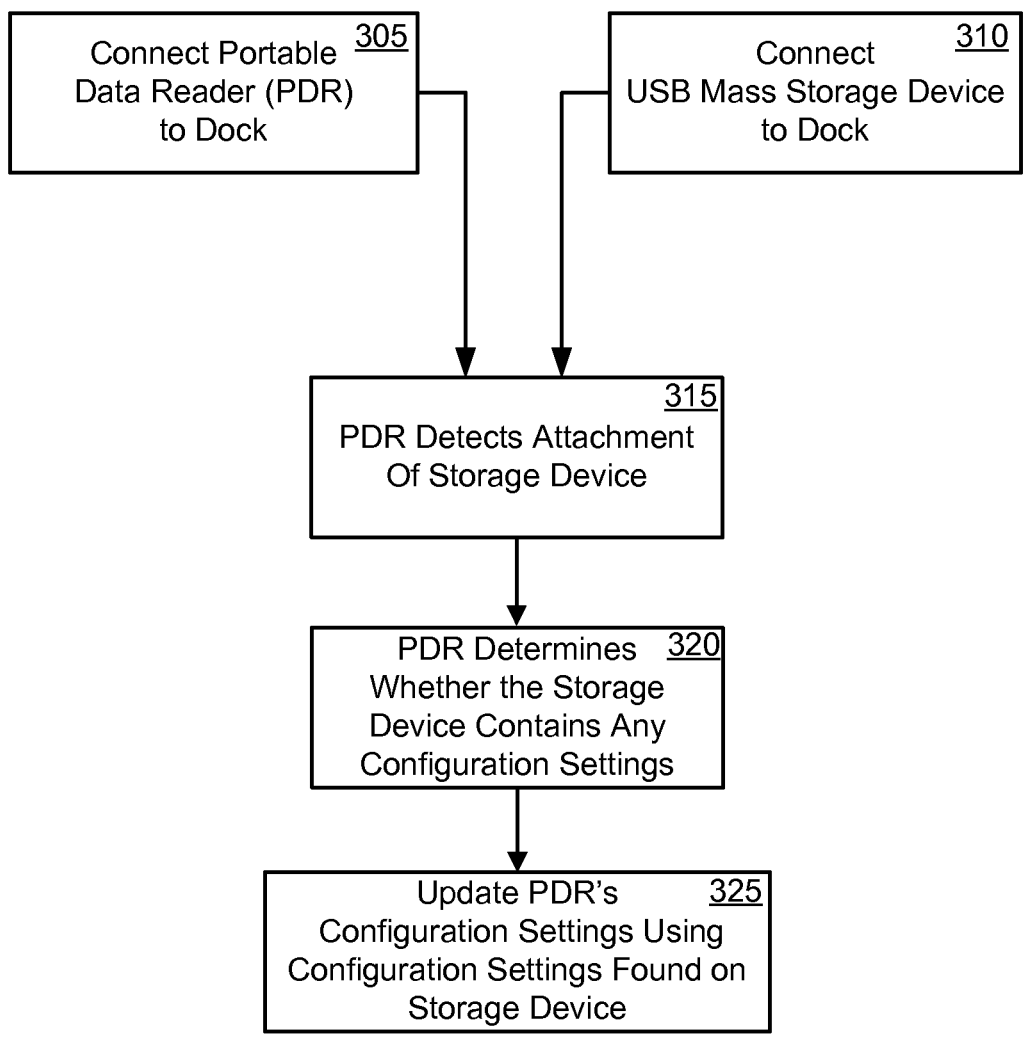
FIG. 3 is a flowchart illustrating a method of updating one or more configuration settings of a portable data reader, according to one embodiment.

FIG. 3 is a flowchart illustrating a method 300 of updating one or more configuration settings of a portable data reader, according to one embodiment. At step 305, a portable data reader is attached to a dock. At step 310, a USB mass storage device is connected to the dock (a further optional step may include storing one or more configuration settings on the USB mass storage device). The USB mass storage device may be connected to the dock before, after, or at the same time that the portable data reader is connected to the dock. Alternatively, the USB mass storage device may be connected directly to the portable data reader (e.g., via connector 109 shown in FIG. 1).

Thus, with reference to FIGS. 2 and 3, the portable data reader may be considered a host in one context and a function in another context. For example, when connected to a personal computer, the personal computer may be considered the host and the portable data reader may be considered the peripheral. By way of another example, when the USB mass storage device is connected to the portable data reader, the portable data reader may provide host functionality and the USB mass storage device may be considered the peripheral. Further, in the USB OTG context, the portable data reader may be considered the A-device when connected to the USB mass storage device (e.g., the B-device).

Next, at step 315, the method 300 detects whether the USB mass storage device has been attached to the portable data reader. Step 315 may be accomplished in several ways. According to one embodiment, the portable data reader includes a hub. Hubs may have status bits used to report the attachment or removal of a USB device on one of its ports. Thus, the host may periodically query the hub to retrieve the bits to determine if a device has been attached or removed. For example, the portable data reader may include a hub and a host driver (e.g., supplied with the OS). After the USB mass storage device and the portable data reader have been connected to the dock, a status bit within the hub may report the attachment. The host driver may periodically poll the status bit to discover if the USB mass storage device (or any other device) has been connected and report this event to the OS, an application program, or another program module. Other suitable methods of detecting whether the USB mass storage device has been attached to the portable data reader may be utilized. For instance, a physical wire that changes state (e.g., from high to low or from low to high) may be included.

At step 320, the method 300 determines whether the USB mass storage device has stored thereon any configuration settings (e.g., decoding options, default bar code symbology). For example, the OS may receive a notification that the USB mass storage device has been attached to the portable data reader and mount a file system (e.g., a directory structure of the USB mass storage device). An application waiting for the USB mass storage device to be attached may also receive a notification (e.g., via the OS) that the storage device has been attached. After being notified, the application may search the directory structure of the USB mass storage device for configuration settings. For example, the application may look for a certain file type that should contain the configuration settings (e.g., a text file or other file type).

Other suitable methods of determining whether the USB mass storage device has configuration settings stored thereon may be utilized. For instance, the USB mass storage device may have stored thereon one or more sentinel files, such as a file that indicates that there is a special file (e.g., the configuration settings) on the file system. Further, information could also be embedded in a control structure of the file allocation table (FAT) that indicates that there is a special file on the file system. In addition, the USB mass storage device may be formatted to include another or unique type of file system. For example, the USB mass storage device could include a FAT16, FAT32, new technology file system (NTFS), or other type of file system. In addition, a unique file system may be specifically designed. For example, the unique file system may look corrupted to other file systems, but may be recognized by the portable data reader.

After determining that the USB mass storage device has configuration settings stored thereon at step 320, the method 300 may optionally determine whether any of the configuration settings stored on the USB mass storage device are different from the configuration settings on the portable data reader. For example, the method 300 may compare each configuration setting on the portable data reader to corresponding configuration settings stored on the USB mass storage device and update only those configuration settings on the portable data reader that are different from the configuration settings on the USB mass storage device. Thus, even if the USB mass storage device contains configuration settings, the configuration settings on the portable data reader may not be updated if the configuration settings on the USB mass storage device are not updated.

At step 325, the method 300 updates one or more of the portable data reader's configuration settings using the configuration settings stored on the USB mass storage device (and optionally restarts the portable data reader). For example, after an application determines that the USB mass storage device has configuration settings stored thereon, the application may transfer (e.g., execute a file copy command) the configuration settings from the USB mass storage device onto the portable data reader (see, e.g., 240 in FIG. 2). However, if the configuration settings are stored within a file, the file need not be transferred to the portable data reader. For example, the portable data reader may simply access the file on the USB mass storage device.

One or more configuration settings on the portable data reader may be updated by transmitting at least one configuration setting to the portable data terminal via an application programming interface (API). For example, after an application determines that the USB mass storage device has configuration settings stored thereon, the application may request the OS to update the portable data reader's configuration settings with the configuration settings found on the USB mass storage device (e.g., via a source code interface). In addition, the application may utilize a standard Win32 API for Windows settings.

Other suitable methods of updating configuration settings on the portable data reader with configuration settings found on the USB mass storage device may be utilized. For instance, the portable data reader's registry settings may be modified. In addition, the USB mass storage device's memory may be physically mapped onto the portable data terminal's system memory. Mapping the USB mass storage device's memory onto the portable data terminal's system memory effectively allows the USB mass storage device to become an extension of the operating system on the portable data reader. If the USB mass storage device includes applications, settings, and configurations, the portable data reader may access the applications, settings, and configurations stored on the USB mass storage device while the operating system on the portable data reader remains the same. In other words, attaching a USB mass storage device and mapping the USB mass storage device's memory on the portable data terminal's system memory effectively extends the operating system on the portable data reader and may allow the portable data reader to contain only part of the operating system until the USB mass storage device is attached to the portable data reader. Thus, attaching a USB mass storage device and mapping the USB mass storage device's memory on the portable data terminal's system memory may be used for security reasons.

The method 300 may update one or more of the portable data reader's configuration settings at step 325 automatically without user intervention, or may prompt the user before updating the configuration settings. Thus, the method 300 may implement an unattended configuration parameter update of the portable data reader once the user connects the portable data reader to the dock without connecting the portable data reader to a host computer.

The following is a sample pseudo code for implementing the method 300 © 2008 Datalogic Mobile, Inc.:

```
*************************************************************
int result;
int resultConfig;
if (USB_DEVICE_ATTACHED) then
    If(USB_STORAGE) then
        result = ReadUSBStorage( )
        if (result == validStorage) then
            resultConfig = FindConfigInUSBStorage( )
        endif
    endif
endif
// load the new settings and reboot using the new settings
if (resultConfig == reboot) then
    result = loadConfigFromUSB( )
    if(result == true) then
        rebootWithNewConfiguration( )
    endif
endif
// load the new settings and do not reboot (just use the new settings)
if (resultConfig == use) then
    result = loadConfigFromUSB( )
    if(result == true) then
        rebootWithNewConfiguration( )
    endif
endif
*************************************************************
```

Multiple portable data readers may be updated with one or more USB mass storage devices. For example, the same or different configuration settings may be stored on a plurality of USB mass storage devices (e.g., settings for inventorying, shipping, and receiving applications). The USB mass storage devices may be plugged into various docks and when each of the portable data readers is plugged into its respective dock (e.g., for charging), its configuration settings may be updated. By way of another example, one USB mass storage device may have a plurality of configuration settings, some of which are intended for specific portable data readers (e.g., the configuration settings are addressable or otherwise marked for use with specific portable data readers). If the USB mass storage device is plugged into a dock, a plurality of portable data readers may access the mass storage device and search for and update configuration settings intended for each of the individual portable data readers.

Operating System Image Update

Traditionally, updating an OS image on a portable data reader involved obtaining an updated OS image (e.g., by downloading the updated OS image) and installing an OS image update utility on a host computer. After attaching the portable data reader to the host computer and executing the OS image update utility on the host computer, the user can navigate through a series of menus to select the updated OS image file and initiate an OS image update (e.g., using a portable data reader with an input device and a display or coupling the portable data reader to a display via a host or other computer). Thus, traditional methods for updating an OS image on a portable data reader require a fair amount of user intervention and knowledge, may be time consuming, and are prone to errors that may corrupt the OS image on the portable data reader thereby rendering the portable data reader inoperable (an inoperable portable data reader may need to be sent to a service center or the manufacturer for repair).

Figure 4:
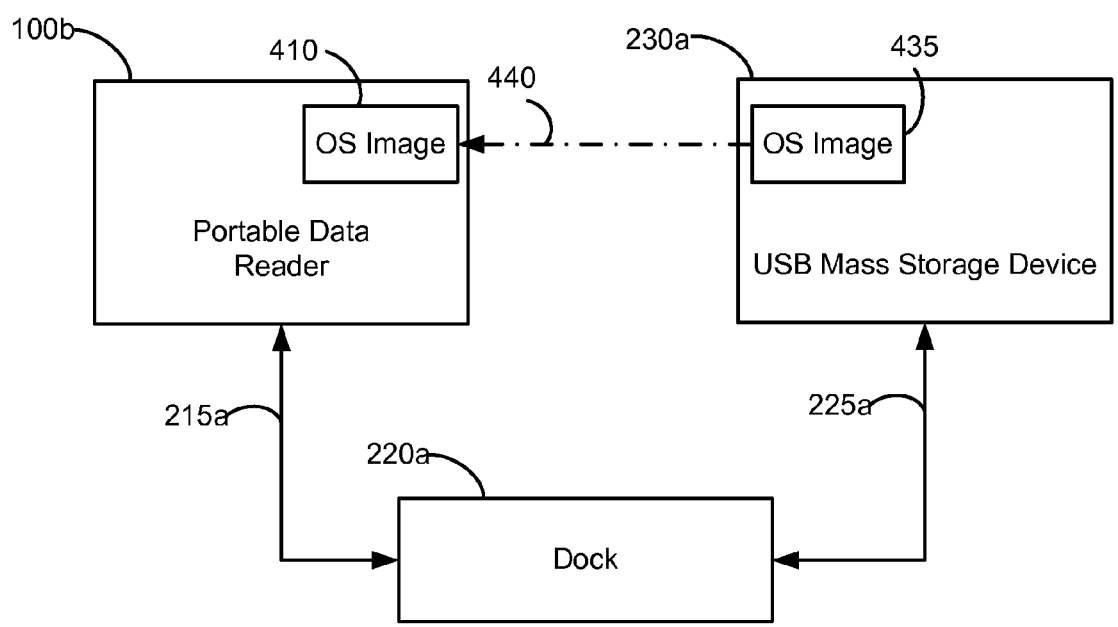
FIG. 4 is a block diagram illustrating a portable data reader and a USB mass storage device connected via a docking station, according to another embodiment.

FIG. 4 is a block diagram of a portable data reader 100b and a USB mass storage device 230a connected via a docking station 220a according to one embodiment (in FIG. 4 reference numerals with a superscripted symbol, e.g., 100b, indicate elements similar to those of the same name as those described with respect to FIGS. 1, 2, and 3, i.e., the portable data reader 100, 100a, or both). As will be described in more detail below, if an updated operating system image 435 is stored on the USB mass storage device 230a and the USB mass storage device 230a is coupled to the docking station 220a, the OS image 410 on the portable data reader 100b may be updated by coupling the portable data reader 100b to the docking station 220a, such as when the portable data reader 100b is placed in the docking station 220a for charging. Thus, a user having little or no computer knowledge can update an OS image of a portable data reader by placing the portable data reader in a docking station, which the user may be accustomed to doing to charge the portable data reader.

The operating system image 410 may be stored in memory 116 (FIG. 1), drive 124, another memory, or any combination thereof, and may comprise executable files containing an operating system kernel and other additional machine-executable code that a boot loader of the portable data reader 100b uses to load an operating system and transfer control of the portable data reader 100b to the operating system (e.g., a 32-bit executable file). The operating system image 410 may also comprise any combination of an operating system kernel and other additional machine-executable code, one or more configuration files, and one or more data files that together form the operating system.

As will be described in more detail with respect to FIG. 5A, the operating system image 410 on the portable data reader 100b may be updated 440 with an updated operating system image 435 stored on the USB mass storage device 230a. According to one embodiment, the USB mass storage device 230a comprises a flash memory device. However, the USB mass storage device 230a may include other memory devices, such as magnetic hard drives, optical drives (e.g., a CD-ROM or DVD reader and writer drives), floppy drives, digital cameras with memory, digital audio players with memory, and mobile phones with memory.

According to one embodiment, the USB mass storage device 230a is connected to the portable data reader 100b via the docking station 220a. The dock 220b may have a connector to facilitate a connection between the portable data reader 100b and the dock 220a with or without a cable. For example, the dock 220a may have contacts configured to receive a corresponding connector on the portable data reader 100b (e.g., the connector 109 of FIG. 1). Once connected to the dock 220a, the portable data reader 100b may transfer data to and from the dock 220a via data link 215a. In addition, the dock 220a may also charge a battery within the portable data reader 100b (using a power supply connected to the dock 220a).

The dock 220a may also have a connector to facilitate a connection between the USB mass storage device 230a and the dock 220a (e.g., a USB A-type receptacle or plug, a B-type receptacle or plug, a micro-AB receptacle or plug, other micro or mini USB plug, an RS232 connector, or a PCMCIA connector). Once connected to the dock 220a, the USB mass storage device 230a may transfer data to and from the dock 220a via data link 225a.

As described with reference to FIG. 2, the dock 220a may be configured to convert an I/O connector of the portable data reader 100b into both a USB connector and RS232 connector. In other words, the dock 220a may pass RS232 pins to a RS232 connector mounted thereto and pass USB pins to a USB connector mounted thereto (e.g., a type-A connector, a type-B connector, or a micro-AB receptacle). Thus, the dock 220a may provide a straight through connection between the portable data reader 100b and the USB mass storage device 230a when both devices are connected to the dock 220a. However, the dock 220a may also contain logic, such as logic to implement USB hub functionality.

According to another embodiment, the portable data reader 100b contains a micro-AB receptacle and is configured to support USB OTG peripherals. In other words, the portable data reader 100b may itself be a fully compliant USB 2.0 peripheral, and may also support USB OTG features. In addition, the portable data reader 100b may have full host capability. Thus, the USB mass storage device 230a may be directly connected to the portable data reader 100b if the portable data reader 100b incorporates a proper connector (e.g., a type-A receptacle or a micro-AB receptacle). Other suitable methods of connecting a USB mass storage device (or other peripheral device) to a portable data reader may be utilized, such as those described with reference to FIG. 2.

Figure 5A:
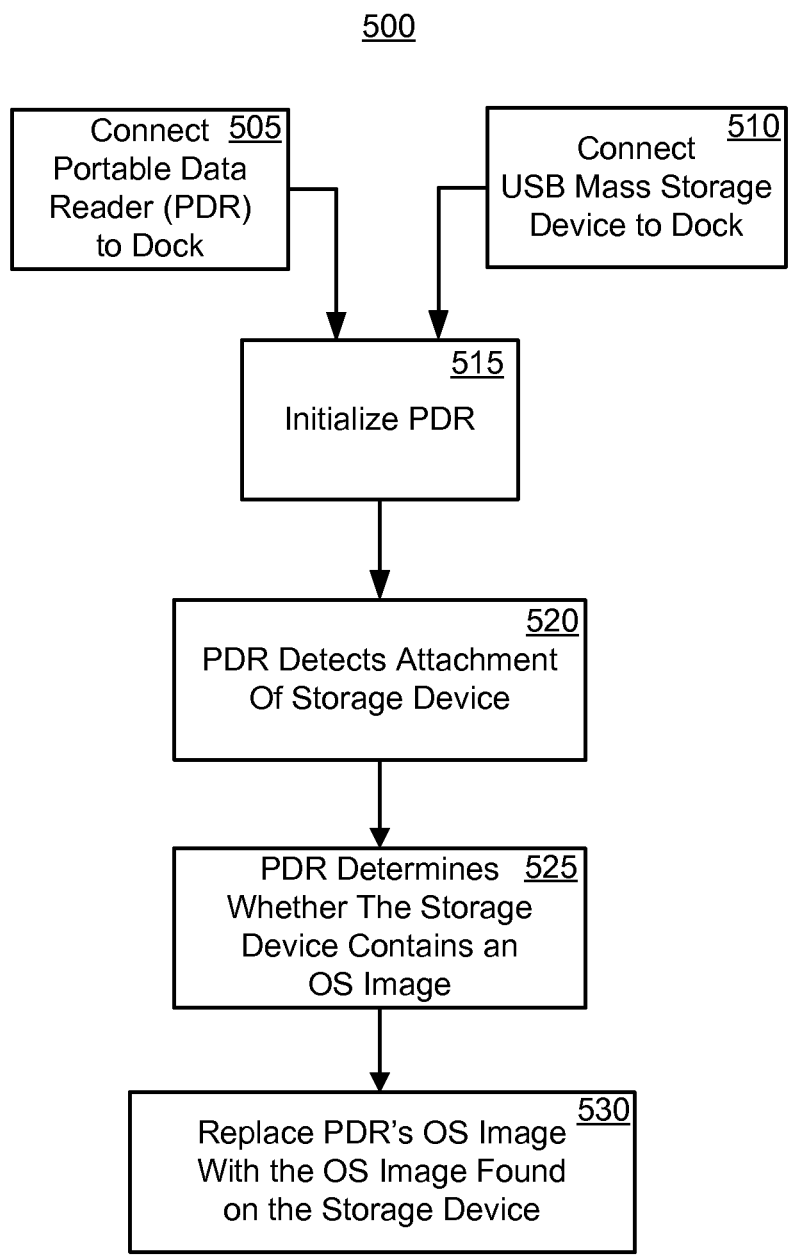
FIGS. 5A and 5B are flowcharts illustrating a method of updating an operating system image on a portable data reader, according to one embodiment.

FIG. 5A is a flowchart illustrating a method 500 of updating an operating system image on a portable data reader, according to one embodiment. At step 505, a portable data reader is attached to a dock. At step 510, a USB mass storage device is connected to the dock (a further optional step may include storing an updated OS image on the USB mass storage device). The USB mass storage device may be connected to the dock before, after, or at the same time that the portable data reader is connected to the dock. Alternatively, the USB mass storage device may be connected directly to the portable data reader (e.g., via connector 109 shown in FIG. 1).

At step 515, the portable data reader is initialized. For example, the portable data reader may be turned on or undergo a hard reboot by cycling its power (e.g., turning the portable data reader off and then back on). In addition a reset line may be activated (e.g., via a reset button). Further, the portable data reader may undergo a soft reboot (e.g., via selecting an option to restart the portable data reader).

With reference to FIGS. 4 and 5, when the USB mass storage device is connected to the portable data reader, the portable data reader may provide host functionality and the USB mass storage device may be considered the peripheral. In addition, the portable data reader may be considered an A-device (USB OTG) when connected to the USB mass storage device (e.g., the B-device).

At step 520, the method 500 detects whether a USB mass storage device has been coupled to the portable data reader. As previously described with reference to FIG. 3, hubs may have status bits used to report the attachment or removal of a USB device on one of its ports. Thus, the host may periodically query the hub to retrieve the bits to determine if a device has been attached or removed. For example, the portable data reader may include a hub and a boot loader (e.g., a program or set of programs that load an image of an operating system that may be run on the portable data reader into memory, such as RAM, and transfers control of the portable data reader to the operating system). After the USB mass storage device and the portable data reader have been connected to the dock, a status bit within the hub may report the attachment. The boot loader (or other application) may poll the status bit to discover if the USB mass storage device (or any other device) is connected. If so, the boot loader may check for an operating system image (see, e.g., step 525). Other suitable methods of detecting that the USB mass storage device has been attached to the portable data reader may be utilized, such as methods similar or identical to those described with reference to FIG. 3.

At step 525, the method 500 determines whether the USB mass storage device has stored thereon an updated operating system image. For example, the boot loader may receive a notification that the USB mass storage device has been attached to the portable data reader or may discover this event itself. The boot loader may then search the USB mass storage device for an updated operating system image. For example, the boot loader may look for a certain file type that might contain the updated operating system image (e.g., a *.img file, *.bin file, *.dmg file, or other file type). By way of another example, the boot loader may be programmed to look for the update operating system image at a specific address. The boot loader may check the operating system image stored on the USB mass storage device to check whether it is indeed an update. For example, the boot loader may compare a date (or version) associated with the operating system image file stored on the USB mass storage device to an a date (or version) associated with the operating system image file stored on the portable data reader. Other suitable methods of determining whether the USB mass storage device has an updated operating system image stored thereon may be utilized, such as methods similar to those described with reference to FIG. 3.

The method 500 updates the operating system image on the portable data reader using the updated operating system image stored on the USB mass storage device at step 530. For example, after the boot loader determines that the USB mass storage device has an updated operating system image (or simply an operating system image) stored thereon, the application may transfer the operating system image from the USB mass storage device onto the portable data reader (see, e.g., the logical update 440 in FIG. 4). In one embodiment, the boot loader copies the operating system image file one block at a time into flash memory within the portable data reader.

Figure 5B:
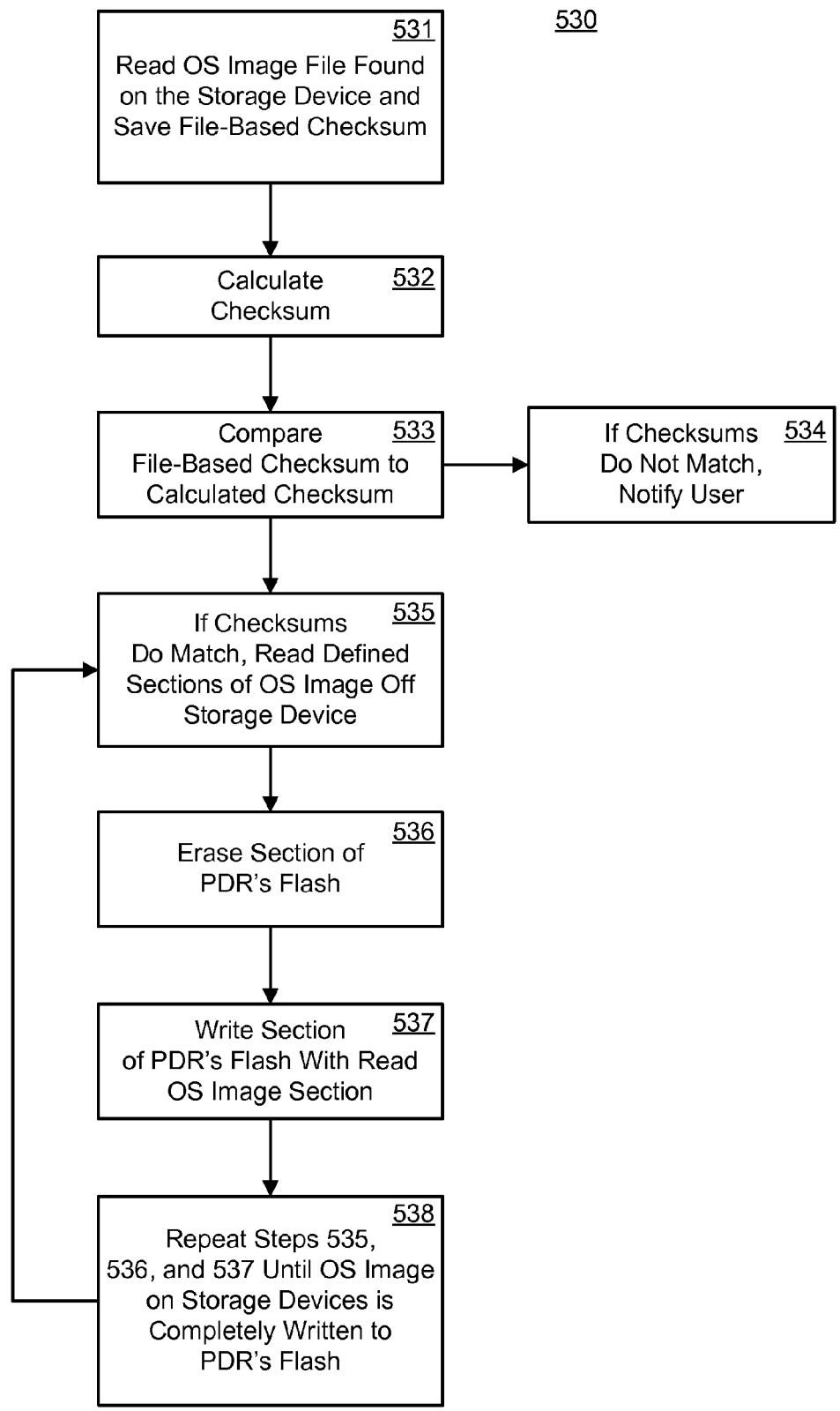

For example, FIG. 5B is a flowchart illustrating additional details of step 530, according to one embodiment. At step 531, the OS image file found on the storage device is read and a file-based checksum is read. At step 532, a checksum for the OS image file found on the storage device is calculated using any number of checksum generation techniques. At step 533, the file-based checksum is compared to the calculated checksum. If the checksums do not match, the user is notified at step 534 and the OS image update may be aborted. If the checksums do match, defined sections of the OS image are read from the storage device at step 535. At step 536, a section of the portable data reader's internal flash memory is erased. At step 537, the erased section of the portable data reader's flash is written with the section of the OS image read at step 535. At step 538, steps 535, 536, and 537 are repeated until the OS image on the storage devices is completely written to the portable data reader's flash.

The boot loader may also transfer the operating system image stored on the portable data reader (e.g., the prior OS image) to the USB mass storage device. The backup copy may be used if, for example, the updated operating system image becomes corrupt during transfer. According to a preferred embodiment, the method 300 does not backup operating data from the portable data reader on the USB mass storage device at step 530. Other suitable methods of updating the operating system image on the portable data reader with an operating system image found on the USB mass storage device may be utilized, such as methods similar to those described with reference to FIG. 3.

After the boot loader has been reprogrammed (e.g., updated) the portable data reader, the boot loader (or user) may initiate a soft reboot. Thereafter, the portable data reader may boot using the updated operating system image. In one method, the USB mass storage device may be disconnected from the portable data reader before the soft reboot. However, if the USB mass storage device were still connected, the portable data reader may recognize that the operating system image stored on the USB mass storage device is not an update. For example, the portable data reader may recognize that the operating system image stored on the USB mass storage device is not newer than the currently installed operating system image (e.g., by checking associated dates or versions) and abort the OS image update.

The method 500 may update the operating system image of the portable data reader at step 535 automatically without user intervention, or may prompt the user before updating the operating system image. Thus, the method 500 may implement an unattended operating system image update of the portable data reader once the user connects the portable data reader to the dock without connecting the portable data reader to a host computer.

The following is a sample pseudo code for implementing the method 500 © 2008 Datalogic Mobile, Inc.

```
*************************************************************
int result;
int resultImage;
if (USB_DEVICE_ATTACHED) then
    If(USB_STORAGE) then
        result = ReadUSBStorage( )
        if (result == validStorage) then
            resultImage = FindImageInUSBStorage( )
        endif
    endif
endif
```

```
// load an updated image into memory and restart using the updated image
if (resultImage == true) then
    result = loadImageFromUSB( )
    if(result == true) then
        rebootWithNewImage( )
    endif
endif
****************************************************************
```

Multiple portable data readers may be updated with one or more USB mass storage devices. For example, the same or different operating system images may be stored on a plurality of USB mass storage devices (e.g., operating systems images optimized for inventorying, shipping, and receiving applications). The USB mass storage devices may be plugged into various docks and when each of the portable data readers is plugged into its respective dock (e.g., for charging) and rebooted, its operating system image may be updated. By way of another example, one USB mass storage device may have a plurality of operating system images, some of which are intended for specific portable data readers (e.g., the operating system images are addressable or otherwise marked for use with specific portable data readers). If the USB mass storage device is plugged into a dock, a plurality of portable data readers may access the mass storage device and search for and update their operating system images intended for each of the individual portable data readers.

Booting Alternate Operating System

Traditionally, booting an alternate OS on a portable data reader has involved obtaining an alternate OS image (e.g., by downloading the alternate OS image) and installing an OS image update utility on a host computer. After attaching the portable data reader to the host computer and executing the OS image update utility on the host computer, the user can navigate through a series of menus to select the alternate OS image file and initiate an OS image update that replaces the OS image on the portable data reader with the alternate OS image. Thus, traditional methods for booting an alternate OS on a portable data reader require a fair amount of user intervention and knowledge, may be time consuming, and are prone to errors that may corrupt the OS image on the portable data reader thereby rendering the portable data reader inoperable (an inoperable portable data reader may need to be sent to a service center or the manufacturer for repair). Additionally, if the user wants to revert back to the prior OS version, the user would need to update the OS image on the portable data reader with the prior version of the OS image. Thus, if the user simply wants to test new features of another OS version, the user traditionally needed to update the portable data reader with the other OS image. Then, if the user wanted to revert back to the prior OS, the user would needed to update the portable data reader with the prior OS image.

Figure 6:
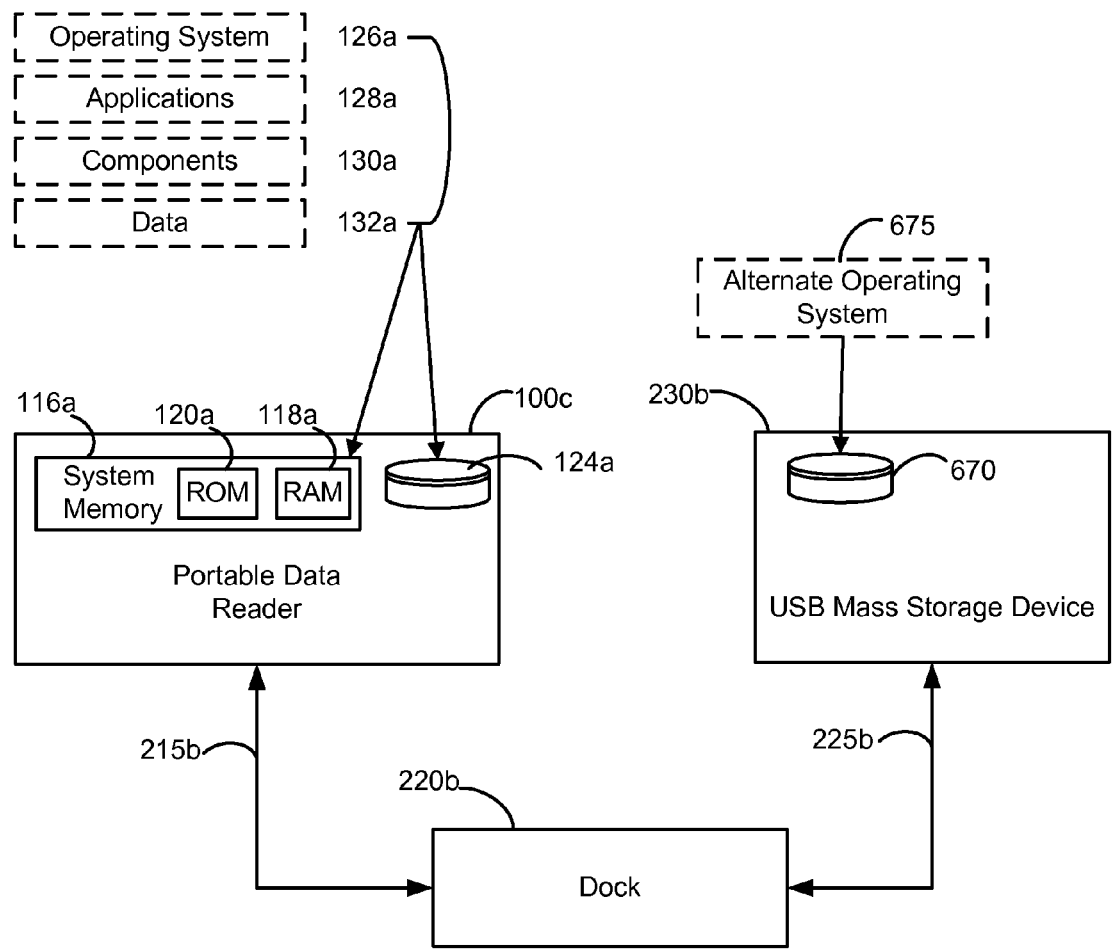
FIG. 6 is a block diagram illustrating a portable data reader and a USB mass storage device connected via a docking station, according to yet another embodiment.

FIG. 6 is a block diagram of a portable data reader 100c and a USB mass storage device 230b connected via a docking station 220b, according to one embodiment (in FIG. 6 reference numerals with a superscripted symbol, e.g., 100c, indicate elements similar to those of the same name as those described with respect to FIGS. 1, 2, 3, 4, and 5 i.e., the portable data reader 100, 100a, 100b, or any combination thereof). As will be described in more detail with respect to FIG. 7, the portable data reader 100c may boot an alternate operating system 675 from the USB mass storage device 230b (e.g., OS 126a may comprise Windows® CE 5.0 and alternate OS 675 may comprise Windows® Mobile). Booting an alternate OS may allow a new or modified OS with a new set of features to be run on the portable data reader 100c without first reprogramming the portable data reader 100c. The new or revised features may, for example, provide bar code decoding enhancements, provide new types of data translation, and provide performance improvements. Booting an alternate OS may allow a user to try certain features without giving up their previous operating system. For example, a vendor may allow a user to test a new or revised OS by simply sending the user a USB mass storage device 230b with an alternate OS stored thereon. Thus, booting an alternate OS may help provide proof of concept for OS designs, allow customers to validate new versions of an OS, and may help test new operating systems on different portable data readers.

As previously discussed, entirely updating the OS of a portable data reader 100c may involve reflashing the portable data reader 100c (e.g., load the OS onto the portable data reader's internal flash memory). Entirely updating the OS of a portable data reader 100c may take some time and may require the user to send the portable data reader 100c to the manufacturer or to a technical support center. In addition, reflashing carries with it the risk that an error may arise during reflash that corrupts the OS image stored on the portable data reader, which may require the user to purchase a new portable data reader 100c (or have the portable data reader 100c repaired). Thus, booting the alternate OS off of the USB mass storage device 230b may allow the user to test the new or revised features. After the portable data terminal 100c is rebooted (and the USB mass storage device 230b is disabled), the portable data terminal 100c may revert back to the prior version of the OS.

As described with reference to FIG. 1, the portable data reader 100c may include a memory 116a, which may include, for instance, RAM 118a, ROM 120a. The portable data reader 100c may also include an internal hard disk drive 124a. In one embodiment, any number of program modules may be stored in the drives (e.g., drive 124a) and RAM 118a, including an operating system (OS) 126a, one or more application programs 128a, other program modules 130a, data 132a, or any combination thereof. All or portions of the program modules may also be cached in RAM 118a. The operating system 126a may include Windows CE 5.0, Windows Mobile, Linux, or other commercially available or proprietary operating systems.

According to a preferred embodiment, the USB mass storage device 230b comprises a flash memory device (or other suitable non-volatile memory). However, the USB mass storage device 230b may include other memory devices, such as magnetic hard drives, optical drives (e.g., a CD-ROM or DVD reader and writer drives), floppy drives, digital cameras with memory, digital audio players with memory, and mobile phones with memory. In addition, the USB mass storage device 230b may be partitioned to facilitate various file structures.

The USB mass storage device 230b may be connected to the portable data reader 100c via the docking station 220b. The dock 220b may have a connector to facilitate a connection between the portable data reader 100c and the dock 220b with or without a cable. For example, the dock 220b may have contacts configured to receive a corresponding connector on the portable data reader 100c (e.g., the connector 109 of FIG. 1). Once connected to the dock 220b, the portable data reader 100c may transfer data to and from the dock 220b via data link 215b. In addition, the dock 220b may also charge a battery within the portable data reader 100c (using a power supply connected to the dock 220b).

The dock 220b may also have a connector to facilitate a connection between the USB mass storage device 230b and the dock 220b (e.g., a USB A-type receptacle or plug, a B-type receptacle or plug, a micro-AB receptacle or plug, other micro or mini USB plug, an RS232 connector, or a PCMCIA connector). Once connected to the dock 220b, the USB mass storage device 230b may transfer data to and from the dock 220b via data link 225b.

As described with reference to FIGS. 2 and 4, the dock 220b may be configured to convert an I/O connector of the portable data reader 100c into both a USB connector and RS232 connector. In other words, the dock 220b may pass RS232 pins to a RS232 connector mounted thereto and pass USB pins to a USB connector mounted thereto (e.g., a type-A connector, a type-B connector, or a micro-AB receptacle). Thus, the dock 220b may provide a straight through connection between the portable data reader 100c and the USB mass storage device 230b when both devices are connected to the dock 220b. However, the dock 220b may also contain logic, such as logic to implement a USB hub.

In another embodiment, the portable data reader 100c contains a micro-AB receptacle and is configured to support USB OTG peripherals. In other words, the portable data reader 100c may itself be a fully compliant USB 2.0 peripheral, and may also support USB OTG features. In addition, the portable data reader 100c may have full host capability. Thus, the USB mass storage device 230b may be directly connected to the portable data reader 100c if the portable data reader 100c incorporates a proper connector (e.g., a type-A receptacle or a micro-AB receptacle) Other suitable methods of connecting a USB mass storage device (or other peripheral device) to a portable data reader may be utilized, such as those described with reference to FIGS. 2 and 4.

Figure 7:
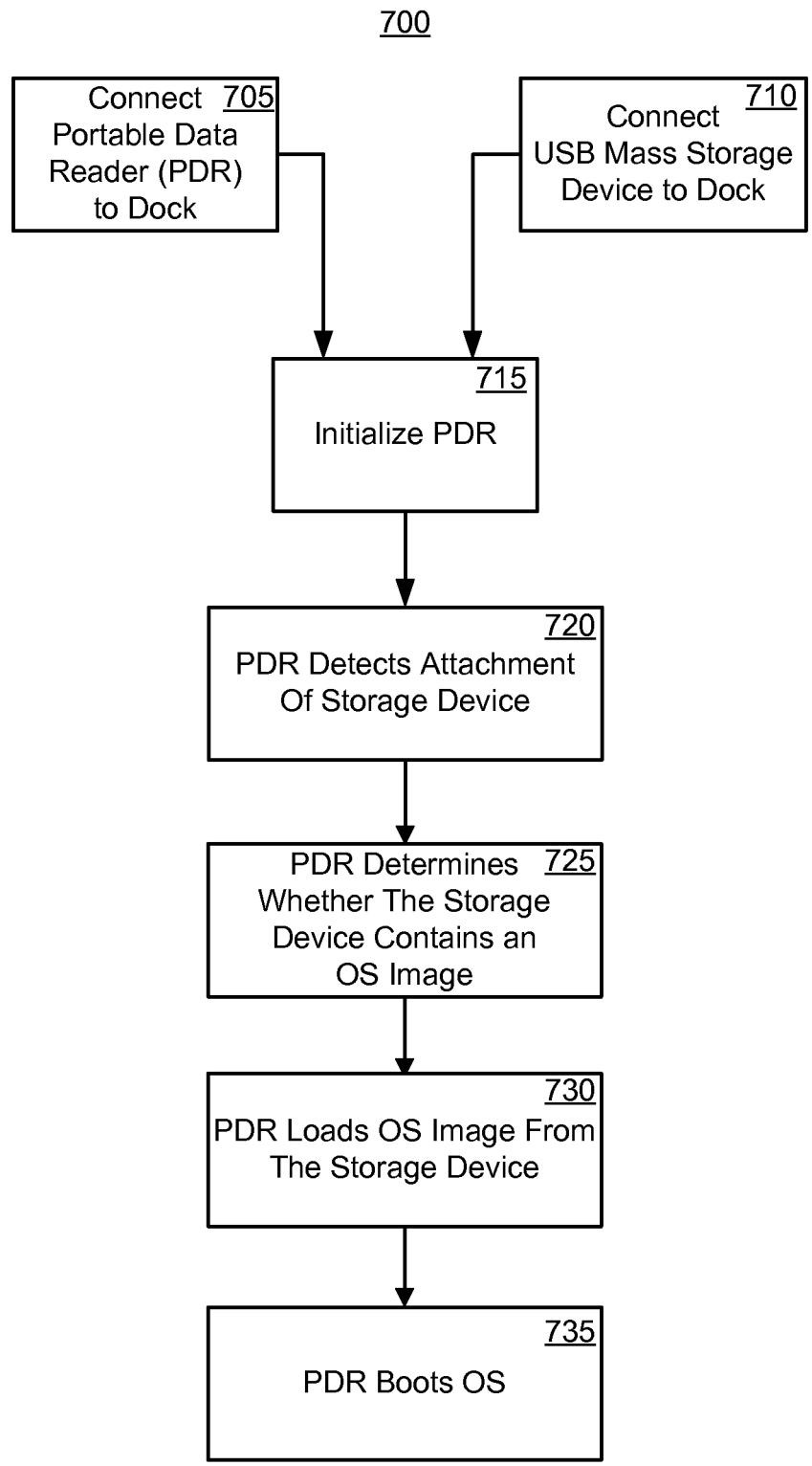
FIG. 7 is a flowchart illustrating a method of booting an alternate operating system on a portable data reader from a USB mass storage device, according to one embodiment.

FIG. 7 is a flowchart illustrating a method 700 of booting an alternate operating system on a portable data reader from a USB mass storage device, according to one embodiment. At step 705, a portable data reader may be attached to a dock. At step 710, a USB mass storage device is connected to the dock (a further optional step may include storing an updated OS image on the USB mass storage device). According to one embodiment, the USB mass storage device is connected to the dock before the portable data reader. However, the portable data reader may be connected before the USB mass storage device, or they may be connected at the same time. Alternatively, the USB mass storage device may be connected directly to the portable data reader. Thus, when the USB mass storage device is connected to the portable data reader, the portable data reader may provide host functionality and the USB mass storage device may be considered the peripheral. In addition, the portable data reader may be considered an A-device (USB OTG) when connected to the USB mass storage device (e.g., the B-device).

At step 715, the portable data reader is initialized. For example, the portable data reader may be powered up or undergo a hard reboot by cycling its power (e.g., turning the portable data reader off and then back on). In addition a reset line may be activated (e.g., via a reset button). Further, the portable data reader may undergo a soft reboot (e.g., via selecting an option to restart the portable data reader).

The method 700 detects whether a USB mass storage device has been coupled to the portable data reader at step 720. As previously described with reference to FIGS. 3 and 5, hubs may have status bits used to report the attachment or removal of a USB device on one of its ports. Thus, the host may periodically query the hub to retrieve the bits to determine if a device has been attached or removed. For example, the portable data reader may include a hub and a boot loader.

After the USB mass storage device and the portable data reader have been connected to the dock, a status bit within the hub may report the attachment. The boot loader (or other application) may poll the status bit to discover if the USB mass storage device (or any other device) is connected. The boot loader may wait a predetermined period of time for the USB mass storage device to be connected. After a certain period of time, the boot loader may boot the OS stored on the portable data reader. In other words, the boot loader may give priority to booting an OS off of the USB mass storage device. Additionally, the boot loader may sequence through a predetermined list of non-volatile storage devices in search of an OS image to load (e.g., start with a USB mass storage device and if a USB mass storage device is not found, boot from memory internal to the portable data reader). Other suitable methods of detecting that the USB mass storage device has been attached to the portable data reader may be utilized, such as methods similar to those described with reference to FIGS. 3 and 5.

At step 725, the method 700 determines whether the USB mass storage device has stored thereon an alternate operating system image. For example, the boot loader may receive a notification that the USB mass storage device has been attached to the portable data reader or may discover this event itself. The boot loader may then search the USB mass storage device for an alternate operating system image. For example, the boot loader may look for a certain file type indicative of an operating system image (e.g., a *.img file, *.bin file, *.dmg file, or other file type). By way of another example, the boot loader may be programmed to look for the update operating system image at a specific address. Other suitable methods of determining whether the USB mass storage device has an alternate operating system image stored thereon may be utilized, such as methods similar or identical to those described with reference to FIGS. 3 and 5.

In one embodiment, the method 700 loads the operating system image from the USB mass storage device onto the portable data reader at step 730. For example, after the boot loader determines that the USB mass storage device has an alternate operating system image (or simply an operating system image) stored thereon, the application may transfer the operating system image from the USB mass storage device onto the portable data reader. Loading the operating system image into RAM 118a, for example, may allow for faster performance. In addition, loading the operating system image into RAM 118a, for example, avoids the need to update the operating system image stored on internal flash memory (e.g., reflashing the portable data reader). However, the method 700 may boot the alternative operating system 675 directly from the USB mass storage device.

At step 735, the method 700 boots the alternate operating system on the portable data reader using the alternate operating system image. Other suitable methods of loading the operating system image on the portable data reader and booting the alternate operating system may be utilized, such as methods similar to those described with reference to FIGS. 3 and 5.

The method 700 may boot an alternate operating system on a portable data reader automatically without user intervention, or may prompt the user before booting the alternate operating system on the portable data reader. Thus, the method 700 may implement an unattended boot of an alternate operating system on a portable data reader once the user connects the portable data reader to the dock without connecting the portable data reader to a host computer and without installing additional hardware in the portable data reader (e.g., particular connectors or one or more switches for rerouting memory requests from internal portable data reader memory to memory on a data card).

The following is a sample pseudo code for implementing the method 700 © 2008 Datalogic Mobile, Inc.:

```
****************************************************************
int result;
int resultAlternateImage;
if (USB_DEVICE_ATTACHED) then
    If(USB_STORAGE) then
        result = ReadUSBStorage( )
        if (result == validStorage) then
            resultAlternateImage =
                FindAlternateImageInUSBStorage( )
        endif
    endif
endif
// load alternate OS (e.g., drivers, file system, settings, and data objects)
and make the alternate OS available to use
if (resultAlternateImage == true) then
    result = loadAlternateImageFromUSB( )
    if(result == true) then
        bootToAlternateImage( )
    endif
endif
****************************************************************
```

Multiple portable data readers may be booted with alternate operating systems with one or more USB mass storage devices. For example, the same or different operating system images may be stored on a plurality of USB mass storage devices (e.g., operating systems optimized for inventorying, shipping, and receiving applications). The USB mass storage devices may be plugged into various docks and when each of the portable data readers is plugged into its respective dock (e.g., for charging) and rebooted, an alternative operating system is booted onto each of the portable data readers. By way of another example, one USB mass storage device may have a plurality of operating system images, some of which are intended for specific portable data readers (e.g., the operating system images are addressable or otherwise marked for use with specific portable data readers). If the USB mass storage device is plugged into a dock, a plurality of portable data readers may access the mass storage device and search for, load, and boot their respective alternate operating systems.

Loading Device-Specific Drivers

Figure 8:
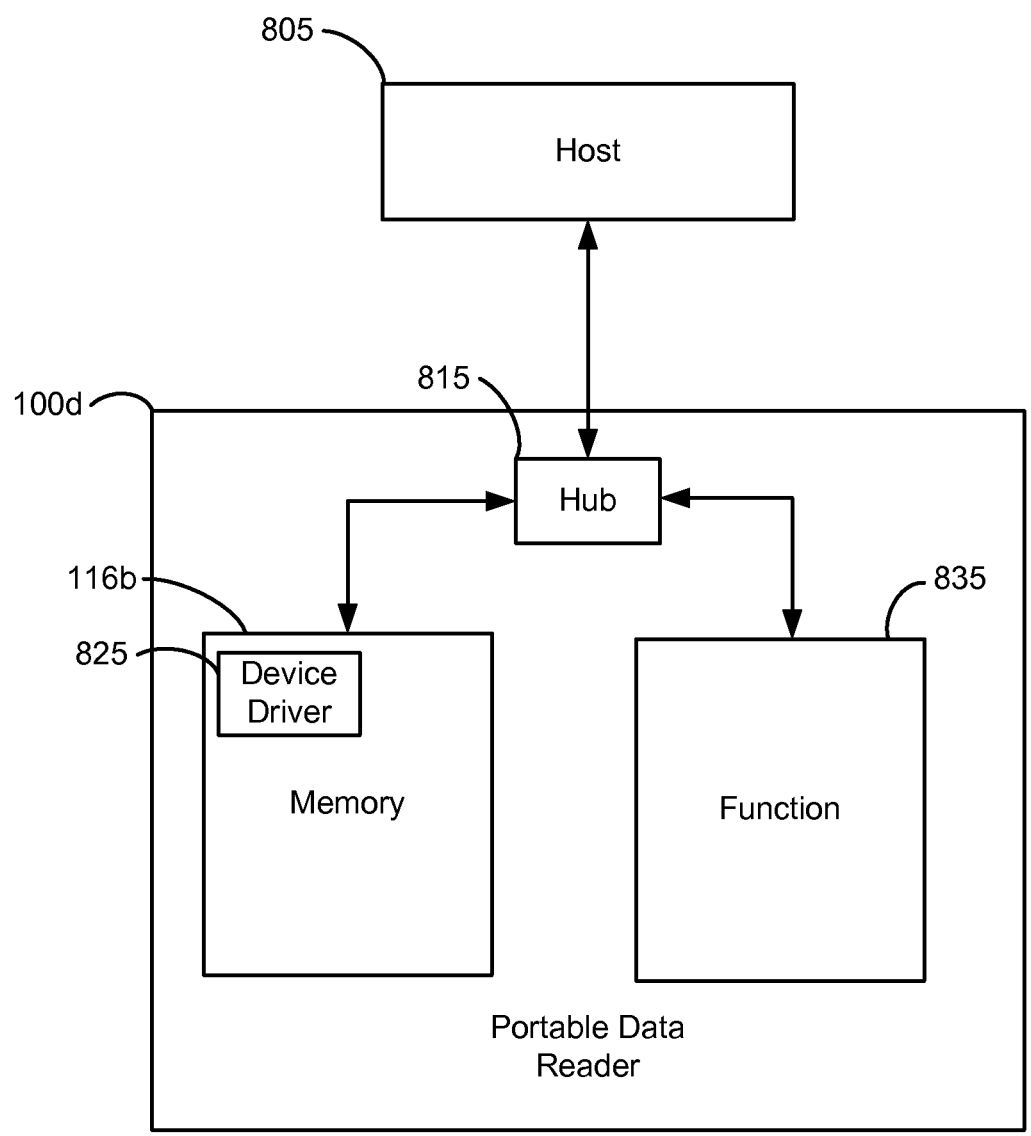
FIG. 8 is a block diagram illustrating a portable data reader connected to a host, according to one embodiment.

FIG. 8 is a block diagram of a portable data reader 100*d* connected to a host 805 according to one embodiment (in FIG. 8 reference numerals with a superscripted symbol, e.g., 100*d*, indicate elements similar to those of the same name as those described with respect to FIG. 1-7, i.e., the portable data readers 100, 100*a*, 100*b*, 100*c*, or any combination thereof). The host 805 may be a personal computer or any other machine that manipulates data according to a list of instructions. Thus, the personal computer may be considered the host 805 and the portable data reader 100*d* may be considered the peripheral. In addition, if a USB mass storage device (not shown) is connected to the portable data reader 100*d*, the portable data reader 100*d* may provide host functionality and the USB mass storage device may be considered the peripheral.

Certain devices may require drivers to fully function over a USB. According to one embodiment, a USB storage device embedded within an attachable peripheral contains a device driver 825 stored in memory 116*b*. Thus, when connected to the host 805, the host may load the required driver 825 from the portable data reader 100*d*. Loading the required driver 825 from the portable data reader 100*d* may avoid having to install an operating system containing a wide variety of drivers needed to support a large array of possible peripherals. In addition, this allows the peripheral to supply its own driver and may avoid having to distribute separate media along with peripherals with the necessary drivers.

While embodiments disclosed herein have been discussed with reference to USB mass storage devices, the embodiments disclosed herein may be implemented using other memory devices, such as a PC card (PCMCIA card), flash memory, or optical media. Additionally, while certain embodiments have been discussed with reference to portable data readers, the embodiments disclosed herein may be implemented on fixed scanners. Further, while certain embodiments have been discussed with reference to USB, other bus interfaces may be used, such as RS232, FireWire, and other USB versions (e.g., USB 3.0 and beyond).

A portable data reader may comprise any combination of the embodiments disclosed herein. For example, the following is a sample pseudo code for updating configuration settings on a portable data reader, updating an OS image on a portable data reader, and booting an alternate OS on a portable data reader © 2008 Datalogic Mobile, Inc.:

```
****************************************************************
int result;
int resultConfig;
int resultImage;
int resultAlternateImage;
if (USB_DEVICE_ATTACHED) then
    If(USB_STORAGE) then
        result = ReadUSBStorage( )
        if (result == validStorage) then
            resultConfig = FindConfigInUSBStorage( )
            resultImage = FindImageInUSBStorage( )
            resultExtension = FindAlternateImageInUSBStorage( )
        endif
    endif
endif
// load the updated settings and reboot using the updated settings
if (resultConfig == reboot) then
    result = loadConfigFromUSB( )
    if(result == true) then
        rebootWithNewConfiguration( )
    endif
endif
// load the updated settings and do not reboot (just use the updated
settings)
if (resultConfig == use) then
    result = loadConfigFromUSB( )
    if(result == true) then
        rebootWithNewConfiguration( )
    endif
endif
// load the new image into memory and restart using the new image
if (resultImage == true) then
    result = loadImageFromUSB( )
    if(result == true) then
        rebootWithNewImage( )
    endif
endif
// load alternate OS (e.g., drivers, file system, settings, and data objects)
and make the alternate OS available to use
if (resultAlternateImage == true) then
    result = loadAlternateImageFromUSB( )
    if(result == true) then
        bootToAlternateImage( )
    endif
endif
****************************************************************
```

Thus, as should be appreciated in view of the teachings herein, certain embodiments may be capable of achieving certain advantages, including by way of example and not limitation one or more of the following: (1) providing an unattended update of configuration settings of a portable data reader; (2) automatically updating configuration settings of a portable data reader without user intervention; (3) updating configuration settings of a portable data reader without connecting to a host computer (e.g., a PC or server); (4) updating the configuration settings of multiple portable data readers; (5) providing an unattended image update of a portable data reader; (6) automatically updating an operating system image of a portable data reader with little or no user intervention; (7) updating an operating system image of a portable data reader without connecting the portable data reader to a host computer (e.g., a PC or server); (8) updating operating system images of multiple portable data readers; (9) providing proof of concept of software designs for portable data readers; (10) providing customer software validations; (11) providing the ability to boot different operating systems on a portable data reader; (12) providing the ability to boot various operating systems on a portable data reader without reflashing; (13) automatically booting an alternate operating system on a portable data reader without user intervention; (14) booting an alternate operating system on a portable data reader without connecting to a host computer (e.g., a PC or server); and (15) booting alternate operating systems of multiple portable data readers.

The methods and systems disclosed herein may be implemented in and/or by any suitable hardware, software, firmware, or combination thereof. Accordingly, as used herein a component or module can comprise hardware, software, and/or firmware components (e.g., self-contained hardware or software components that interact with a larger system). For example, the methods and systems may exist as one or more software or firmware programs comprised of program instructions in source code, object code, executable code or other formats. A software module or component may include any type of computer instruction or computer executable code located within a memory device or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by a general-purpose or special-purpose processor (or other electronic device). Alternatively, the steps may be performed by hardware components that include specific logic for performing the steps or by a combination of hardware, software, and/or firmware. A result or output from any step, such as a confirmation that the step has or has not been completed or an output value from the step, may be stored, displayed, printed, and/or transmitted over a wired or wireless network.

Embodiments may also be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A method of updating, independently of a host computer, an operating system image on a portable data reader, the portable data reader comprising a reading engine configured to read data from an object, an input component configured to communicatively couple the portable data reader to an external non-volatile storage device, an internal non-volatile memory configured to store the operating system image, and a processor configured to be communicatively coupled to the reading engine, the input component, and the internal non-volatile memory, the method comprising:
in response to initialization of the processor, the portable data reader automatically determining whether the external non-volatile storage device has been coupled to the portable data reader, the external non-volatile storage device having stored thereon multiple operating system images including a first operating system image and a second operating system image, the first and second operating system images being preselected for use by the portable data reader, wherein the second operating system image is different from the first operating system image;
in response to determining that the external non-volatile storage device has been coupled to the portable data reader, the portable data reader automatically searching the external non-volatile storage device for an updated operating system image that is configured for use by the portable data reader;
in response to finding that the external non-volatile storage device has stored thereon the multiple operating system images, the portable data reader determining from among the multiple operating system images that the first operating system image is the updated operating system image that is configured for use by the portable data reader;

storing the updated operating system image in the internal non-volatile memory;

wirelessly connecting the portable data reader to a docking station, the docking station comprising a first connector for wirelessly connecting the portable data reader to the docking station and a second connector configured to connect a USB mass storage device to the docking station;

and connecting the USB mass storage device to the docking station via the second connector.

2. The method of claim 1 wherein the external non-volatile storage device comprises the USB mass storage device, the method further comprising:

operating the portable data reader as a USB limited host having host control over a predetermined number of peripherals including the USB mass storage device.

3. A portable data reader for reading data from an object, comprising:

a reading engine configured to read data from an object;

an input component configured to communicatively couple the portable data reader to an external non-volatile storage device that is configured to store multiple operating system images including a first operating system image and a second operating system image, the first and second operating system images being preselected for use by the portable data reader, wherein the second operating system image is different from the first operating system image;

an internal non-volatile memory storing a set of configuration settings associated with the portable data reader, the set of configuration settings including at least one setting associated with the reading engine;

a processor configured to be communicatively coupled to the reading engine, the input component, and the internal non-volatile memory, the processor configured to:

in response to the external non-volatile storage device being coupled to the portable data reader independently of a host computer, automatically detect that the external non-volatile storage device has been coupled to the portable data reader;

in response to detecting that the external non-volatile storage device has been coupled to the portable data reader, automatically search the external non-volatile storage device for an updated operating system configured for use by the portable data reader;

in response to finding that the external non-volatile storage device has stored thereon the multiple operating system images, determine from among the multiple operating system images that the first operating system image is the updated operating system image that is configured for use by the portable data reader;

store the first operating system image in the internal non-volatile memory; and wireless connection circuitry for wirelessly connecting the portable data reader to a docking station comprising a first connector for wirelessly connecting the portable data reader to the docking station and a second connector configured to connect a USB mass storage device to the docking station.

4. The portable data reader of claim 3 wherein the external non-volatile storage device comprises the USB mass storage device and wherein the portable data reader is configured to have limited host control over a predetermined number of peripherals including the USB mass storage device.

5. The portable data reader of claim 3, wherein the first operating system image includes updated configuration settings selected from the group consisting of display settings, network settings, device settings, decoding settings, user interface settings, and input settings.

6. A method of booting an alternate operating system on a portable data reader, said portable data reader comprising a reading engine configured to read data from an object, an input component configured to communicatively couple the portable data reader to an external non-volatile storage device, an internal non-volatile memory storing a boot loader and an executable file containing a primary operating system kernel that the boot loader uses to boot a primary operating system on the portable data reader, and a processor configured to be communicatively coupled to the reading engine, the input component, and the internal memory, the method comprising:

in response to initialization of the processor, determining whether the external non-volatile storage device has been coupled to the portable data reader;

in response to determining that the external non-volatile storage device has been coupled to the portable data reader, determining whether the external non-volatile storage device has stored thereon an executable file containing an alternate operating system kernel that the boot loader is configured to use to boot an alternate operating system on the portable data reader;

in response to determining that the external non-volatile storage device has stored thereon the executable file containing the alternate operating system kernel, booting the alternate operating system from the external non-volatile storage device;

wirelessly connecting the portable data reader to a docking station, the docking station comprising a first connector for wirelessly connecting the portable data reader to the docking station and a second connector configured to connect a USB mass storage device to the docking station; and connecting the USB mass storage device to the docking station via the second connector.

7. The method of claim 6 wherein the external non-volatile storage device comprises the USB mass storage device, the method further comprising:

operating the portable data reader as a USB limited host having host control over a predetermined number of peripherals including the USB mass storage device.

8. The method of claim 6 wherein determining whether the external non-volatile storage device has been coupled to the portable data reader comprises the boot loader searching for the external non-volatile storage device before booting the primary operating system on the portable data reader.

9. The method of claim 6 wherein booting the alternate operating system kernel does not update the primary operating system kernel.

10. The method of claim 6 wherein the alternate operating system includes additional features relative to the primary operating system, the additional features selected from the group consisting of a decoding enhancement, an updated type of data translation, and a performance improvement.

11. A method of extending an operating system image on a portable data reader, said portable data reader comprising a reading engine configured to read data from an object, an input component configured to communicatively couple the portable data reader to an external non-volatile storage device, an internal non-volatile memory storing a boot loader and an executable file containing a first operating system kernel that the boot loader is configured to use to boot a first operating system on the portable data reader, and a processor communicatively coupled to the reading engine, the input component, and the internal non-volatile memory, the method comprising:

in response to initialization of the processor, automatically determining whether the external non-volatile storage device has been coupled to the portable data reader;

in response to determining that the external non-volatile storage device has been coupled to the portable data reader, automatically mapping a memory of the external non-volatile storage device onto the internal non-volatile memory of the portable data reader; and accessing applications, settings, and configurations stored on the external non-volatile storage device through the memory that is mapped onto the internal non-volatile memory of the portable data reader;

wirelessly connecting the portable data reader to a docking station, the docking station comprising a first connector for wirelessly connecting the portable data reader to the docking station and a second connector configured to connect a USB mass storage device to the docking station; and connecting the USB mass storage device to the docking station via the second connector.

12. The method of claim 11 wherein the external non-volatile storage device comprises the USB mass storage device and further comprising:

operating the portable data reader as a USB limited host having host control over a predetermined number of peripherals including the USB mass storage device.

13. The method of claim 6 wherein booting the alternate operating system on the portable data reader using the alternate operating system kernel is performed independently of a host computer.

14. The method of claim 1 wherein the first operating system image comprises the updated operating system and an updated operating system kernel, the method further comprising:

booting, via a boot loader stored in the internal non-volatile memory, the updated operating system on the portable data reader using the updated operating system kernel.

15. The method of claim 1 wherein the searching the external non-volatile storage device for the updated operating system image configured for use by the portable data reader comprises searching the external non-volatile storage device using a boot loader stored in the internal non-volatile memory.

16. The method of claim 1 wherein the searching the external non-volatile storage device for the updated operating system image configured for use by the portable data reader comprises searching for operating system images that include information identifying the operating system images for use by the portable data reader.

17. The method of claim 1 wherein the determining that the first operating system image is the updated operating system image that is configured for use by the portable data reader comprises checking release date information associated with the first operating system image to determine whether the first operating system image is newer than a deployed operating system on the portable data reader.

18. The method of claim 17, further comprising aborting the operating system update in response to the first operating system image being not newer than the deployed operating system on the portable data reader.

19. The method of claim 11 wherein the settings and configurations are selected from the group consisting of display settings, network settings, device settings, decoding settings, user interface settings, and input settings.

20. The method of claim 11, further comprising:

automatically updating, without user intervention, one or more of configuration settings of the portable data reader in response to the external non-volatile storage device being coupled to the portable data reader.

21. The method of claim 20 wherein the portable data reader includes a reading engine, the method further comprising:

updating on the portable data reader at least one setting associated with the reading engine based on a configuration setting accessed through the memory that is mapped onto the internal non-volatile memory.

22. The method of claim 20, further comprising:

updating on the portable data reader one or more decoding options of the portable data reader based on a configuration setting accessed through the memory that is mapped onto the internal non-volatile memory.

23. The method of claim 6 wherein the alternate operating system is automatically booted on the portable data reader, without user intervention, once the external non-volatile storage device is coupled to the portable data reader.

* * * * *